US012725169B2

(12) United States Patent
Williams et al.

(10) Patent No.: US 12,725,169 B2
(45) Date of Patent: Sep. 1, 2026

(54) SYSTEMS AND METHODS FOR MANAGING AND MONITORING CONTINUOUS ATTESTATION OF SECURITY REQUIREMENTS

(71) Applicant: Referentia Systems Incorporated, Honolulu, HI (US)

(72) Inventors: Timothy C. Williams, Sterling, VA (US); Nelson T. Kanemoto, Honolulu, HI (US)

(73) Assignee: Referentia Systems Incorporated, Honolulu, HI (US)

( * ) Notice: Subject to any disclaimer, the term of this patent is extended or adjusted under 35 U.S.C. 154(b) by 0 days.

(21) Appl. No.: 18/773,536

(22) Filed: Jul. 15, 2024

(65) Prior Publication Data

US 2024/0370882 A1 Nov. 7, 2024

Related U.S. Application Data

(63) Continuation of application No. 16/571,024, filed on Sep. 13, 2019, now Pat. No. 12,039,546.

(51) Int. Cl.
*G06Q 30/00* (2023.01)
*G06F 21/62* (2013.01)
(Continued)

(52) U.S. Cl.
CPC ....... *G06Q 30/018* (2013.01); *G06F 21/6218* (2013.01); *G06Q 30/0611* (2013.01);
(Continued)

(58) Field of Classification Search
CPC ............. G06Q 30/018; G06Q 30/0611; G06Q 30/0641; G06Q 30/0643; G06Q 30/06431;
(Continued)

(56) References Cited

U.S. PATENT DOCUMENTS 10,554,668 B2 * 2/2020 Ngo ...................... H04L 63/105
12,039,546 B2 * 7/2024 Williams ................ G06F 21/57
(Continued)

OTHER PUBLICATIONS

SysArc: “How to Prove DFARS/NIST SP 800-171 Compliance in DoD Contracts,” sysarc.com/cyber-security/how-to-prove Jan. 2, 2019, 5pgs; (Year: 2019).*

*Primary Examiner* — Robert M Pond
(74) *Attorney, Agent, or Firm* — Penilla IP, APC

(57) ABSTRACT

A system includes buyer portal logic enabling a buyer to specify security requirements for attestation by a supplier. The system includes attestation program logic enabling the supplier to define a continuous attestation program for the security requirements through a supplier interface provided by supplier portal logic. The continuation attestation program includes an annual attestation program and a sub-annual attestation program. The system receives compliance attestation responses from the supplier for the security requirements and correlates the compliance attestation responses to the continuous attestation program for the supplier. The system enables the supplier to specify an access privilege for the buyer with regard to the supplier’s sub-annual continuous attestation program data and/or annual attestation program data. The system generates compliance evaluation metrics for the supplier in real-time, which includes an overall risk level for the supplier, and exposes in real-time the overall risk level for the supplier to the buyer.

21 Claims, 22 Drawing Sheets

(51) Int. Cl.
*G06Q 30/018* (2023.01)
*G06Q 30/0601* (2023.01)
*H04L 9/40* (2022.01)
*G06F 16/25* (2019.01)

(52) U.S. Cl.
CPC ....... *G06Q 30/0641* (2013.01); *H04L 63/104* (2013.01); *H04L 63/105* (2013.01); *G06F 16/25* (2019.01)

(58) Field of Classification Search
CPC ....... G06Q 30/06432; G06Q 30/06433; G06Q 30/06434; G06Q 30/06435; G06Q 30/0644; G06Q 30/06442; G06Q 30/06444; G06F 21/6218; G06F 16/23; G06F 16/25; H04L 63/104; H04L 63/105
USPC ....................................................... 705/26, 27
See application file for complete search history.

(56) References Cited

U.S. PATENT DOCUMENTS

2017/0223059 A1* 8/2017 Ngo ...................... H04L 63/105
2019/0138729 A1* 5/2019 Blundell ................. G06F 21/57
2020/0234817 A1* 7/2020 De Armas .............. G16H 10/60

* cited by examiner

| Buyer X | |
|---|---|
| Security Requirement | # Suppliers Assigned |
| NIST SP 800-171, Rev. 1 | 2 |
| | |
| | |

| Buyer X | | | | |
|---|---|---|---|---|
| NIST SP 800-171, Rev. 1 | | | | |
| Supplier | Request Date | Request Status | Status Date | Assign/Un-Assign |
| Supplier A | *01/01/2017* | Assigned | *03/01/2017* | UNASSIGN |
| Supplier B | --- | Not Assigned | --- | ASSIGN |
| | | | | |

Fig. 10

| Buyer X | | | ADD SUPPLIER |
|---|---|---|---|
| Supplier | Supplier ID | # Assigned Requirements | |
| Supplier A | *438567690* | 1 | EDIT SUPPLIER |
| Supplier B | *864873549* | 1 | EDIT SUPPLIER |
| | | | |

Fig. 11

| Buyer X | | | | |
|---|---|---|---|---|
| Supplier A Compliance Attestation Responses | | | | |
| NIST SP 800-171, Rev. 1 | | | | |
| Security Requirement | Information | Expected Date | Answer | Notes |
| 3.1.1 Limit system access to authorized users, processes acting on behalf of authorized users, and devices (including other systems). | According to DFARS, you need to:<br>• Define who is authorized to access CDI and systems with CDI, usually through written permission<br>• Require employees to have accounts and log in with passwords before they can access systems with CDI<br>• Require that employees log into devices such as phones, tablets, and laptops before accessing CDI | 04/15/2018 | Yes ⦻<br>No ◯<br>N/A ◯<br>Alternate Approach ◯<br>Unknown ◯<br>Assistance ◯ | |

Fig. 14

| Buyer X | | | | | |
|---|---|---|---|---|---|
| Supplier Group Listing | | | | | |
| Supplier Group Name | Description | Priority | # Suppliers | Exposure | Edit Group |
| Contract 10 | ... | 1 | 15 | Low | EDIT |
| Invest 5 | ... | 3 | 2 | Moderate | EDIT |
| | | | | | |

| Buyer X | | |
|---|---|---|
| Supplier Group: Invest 5 | | |
| Supplier Name | Status | Remove from Group |
| Contract 10 | Assigned | UNASSIGN |
| Invest 5 | Assigned | UNASSIGN |
| ADD SUPPLIER TO GROUP | | |

| Buyer X | | | | | | | | | | |
|---|---|---|---|---|---|---|---|---|---|---|
| Supplier Compliance Summary Table | | | | | | | | | | |
| Supplier Name | Total Questions Answered: # | | | | Progress | Exposure | Imp. % | # Sec. Req. Impacting | | |
| | Yes | No | N/A | Alternative Approach | | | | Low | Mod. | High |
| Supplier A | # | # | # | # | #% | value | #% | # | # | # |
| Supplier B | # | # | # | # | #% | value | #% | # | # | # |

Fig. 20

| Buyer X | | | | | | | | | | |
|---|---|---|---|---|---|---|---|---|---|---|
| Supplier Group Compliance Summary Table | | | | | | | | | | |
| Supplier Group Name | Total Questions Answered: # | | | | Progress | Exposure | Imp. % | # Sec. Req. Impacting | | |
| | Yes | No | N/A | Alternative Approach | | | | Low | Mod. | High |
| Group A | # | # | # | # | #% | value | #% | # | # | # |
| Group B | # | # | # | # | #% | value | #% | # | # | # |

Fig. 21

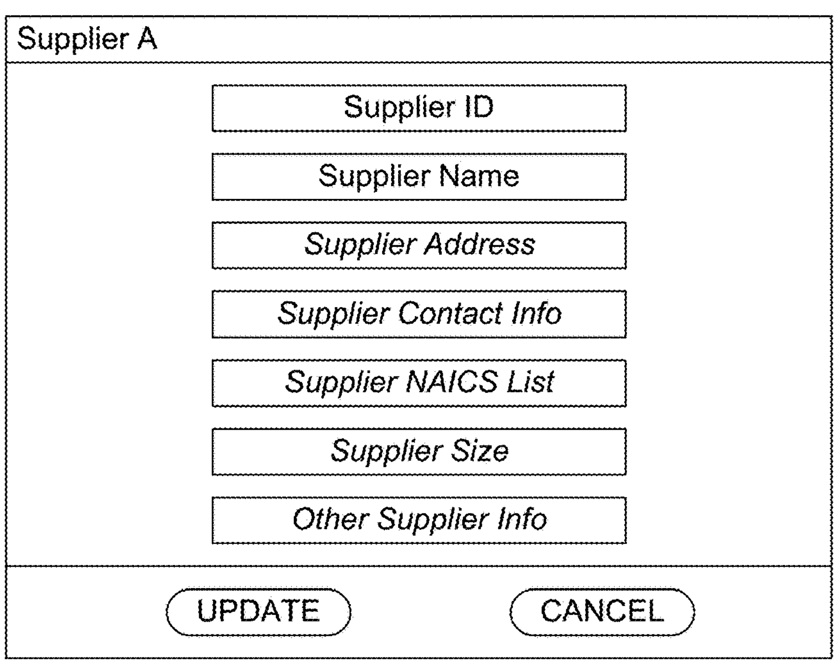
Fig. 22
| Supplier A | | |
|---|---|---|
| NIST SP 800-171, REV. 1 | | |
| Buyer Name | Permission | |
| Buyer X | Annual ◉ | Sub-Annual ◉ |
Fig. 23
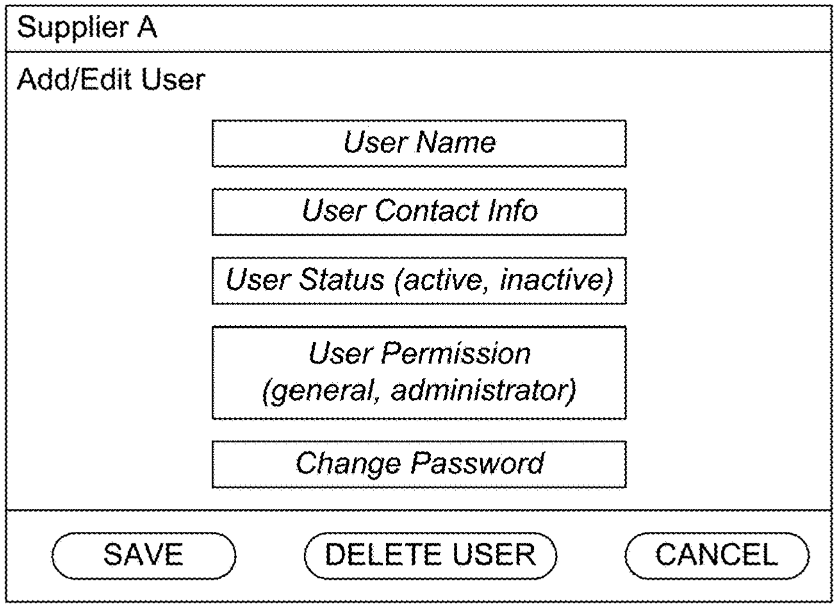
Fig. 24

| Supplier A | | | | |
|---|---|---|---|---|
| Annual Attestation Program | | | | |
| NIST SP 800-171, REV. 1 | | | | |
| Annual Term: 3 | | | | |
| Annual Due Date: March 1 | | | | |
| Requirement | Critical | Year 1 | Year 2 | Year 3 |
| 3.1.1 | ◉ | ○ | ○ | ○ |
| 3.1.2 | ◉ | ○ | ○ | ○ |
| 3.1.3 | ◉ | ○ | ○ | ○ |
| 3.1.4 | ◉ | ○ | ○ | ○ |
| 3.1.5 | ○ | ◉ | ○ | ○ |
| 3.1.6 | ○ | ◉ | ○ | ○ |
| 3.1.7 | ○ | ◉ | ○ | ○ |
| 3.1.8 | ○ | ◉ | ○ | ○ |
| 3.1.9 | ○ | ◉ | ○ | ○ |
| 3.1.10 | ○ | ◉ | ○ | ○ |
| 3.1.11 | ○ | ○ | ◉ | ○ |
| 3.1.12 | ○ | ○ | ◉ | ○ |
| 3.1.13 | ○ | ○ | ◉ | ○ |
| 3.1.14 | ○ | ○ | ◉ | ○ |
| 3.1.15 | ○ | ○ | ◉ | ○ |
| 3.1.16 | ○ | ○ | ◉ | ○ |
| 3.1.17 | ○ | ○ | ○ | ◉ |
| 3.1.18 | ○ | ○ | ○ | ◉ |
| 3.1.19 | ○ | ○ | ○ | ◉ |
| 3.1.20 | ○ | ○ | ○ | ◉ |
| 3.1.21 | ○ | ○ | ○ | ◉ |
| 3.1.22 | ○ | ○ | ○ | ◉ |
| 3.2.1 | ◉ | ○ | ○ | ○ |

Fig. 25

| Supplier A | | | | | | | | | | |
|---|---|---|---|---|---|---|---|---|---|---|
| Sub-Annual Attestation Program | | | | | | | | | | |
| NIST SP 800-171, REV. 1 | | | | | | | | | | |
| Requirement | Semi-Annual | Reference Date | Quarterly | Reference Date | Monthly | Reference Day | Weekly | Reference Day | Daily |
| 3.1.1 | ◉ | *02/01* | ○ | *mm/dd* | ○ | *dd* | ○ | *d* | ○ |
| 3.1.2 | ○ | *mm/dd* | ◉ | *01/15* | ○ | *dd* | ○ | *d* | ○ |
| 3.1.3 | ○ | *mm/dd* | ○ | *mm/dd* | ○ | *dd* | ○ | *d* | ○ |
| 3.1.4 | ○ | *mm/dd* | ○ | *mm/dd* | ○ | *dd* | ○ | *d* | ○ |
| 3.1.5 | ○ | *mm/dd* | ○ | *mm/dd* | ○ | *dd* | ○ | *d* | ○ |
| 3.1.6 | ○ | *mm/dd* | ○ | *mm/dd* | ○ | *dd* | ○ | *d* | ○ |
| 3.1.7 | ○ | *mm/dd* | ○ | *mm/dd* | ○ | *dd* | ○ | *d* | ○ |
| 3.1.8 | ○ | *mm/dd* | ○ | *mm/dd* | ○ | *dd* | ○ | *d* | ○ |
| 3.1.9 | ○ | *mm/dd* | ○ | *mm/dd* | ○ | *dd* | ○ | *d* | ○ |
| 3.1.10 | ○ | *mm/dd* | ○ | *mm/dd* | ○ | *dd* | ○ | *d* | ○ |
| 3.1.11 | ○ | *mm/dd* | ○ | *mm/dd* | ○ | *dd* | ○ | *d* | ○ |
| 3.1.12 | ○ | *mm/dd* | ◉ | *02/15* | ○ | *dd* | ○ | *d* | ○ |
| 3.1.13 | ○ | *mm/dd* | ○ | *mm/dd* | ○ | *dd* | ○ | *d* | ○ |
| 3.1.14 | ○ | *mm/dd* | ○ | *mm/dd* | ○ | *dd* | ○ | *d* | ○ |
| 3.1.15 | ○ | *mm/dd* | ○ | *mm/dd* | ○ | *dd* | ○ | *d* | ○ |
| 3.1.16 | ○ | *mm/dd* | ○ | *mm/dd* | ○ | *dd* | ○ | *d* | ○ |
| 3.1.17 | ◉ | *04/01* | ○ | *mm/dd* | ○ | *dd* | ○ | *d* | ○ |
| 3.1.18 | ○ | *mm/dd* | ◉ | *03/15* | ○ | *dd* | ○ | *d* | ○ |
| 3.1.19 | ○ | *mm/dd* | ◉ | *01/01* | ○ | *dd* | ○ | *d* | ○ |

Fig. 26

| Supplier A | | | |
|---|---|---|---|
| NIST SP 800-171, Rev. 1 | | | |
| Question | Expected Date | Answer | Notes |
| 1. Covered Defense Information, or "CDI," is unclassified controlled technical information or other information that requires safeguarding or dissemination controls and is:<br>(1) Marked or otherwise identified in the contract, task order, or delivery order and provided to the contractor by or on behalf of the DoD in support of the performance of the contract; or<br>(2) Collected, developed, received, transmitted, used, or stored by or on behalf of you in support of the performance of the contract.<br>CDI is referenced in a number of the following questions. Please see DFARS 252.204-7012(a) for a complete definition of CDI.<br><br>How many physical sites (other offices, home offices, etc.) will be holding or accessing Covered Defense Information (CDI)? | 01/01/2020 | # | |
| 2. Do you have policies and procedures for managing logical and physical security of CDI systems? | 01/01/2020 | Yes ◯<br>No ◯ | |

Fig. 27

| Supplier A | | | | |
|---|---|---|---|---|
| NIST SP 800-171, Rev. 1 | | | | |
| Security Requirement | Information | Expected Date | Answer | Notes |
| 3.1.1 Limit system access to authorized users, processes acting on behalf of authorized users, and devices (including other systems). | According to DFARS, you need to:<br>• Define who is authorized to access CDI and systems with CDI, usually through written permission<br>• Require employees to have accounts and log in with passwords before they can access systems with CDI<br>• Require that employees log into devices such as phones, tablets, and laptops before accessing CDI | 02/01/2020 | Yes ○<br>No ○<br>N/A ○<br>Alternate Approach ○<br>Unknown ○<br>Assistance ○ | |
| 3.1.2 Limit system access to the types of transactions and functions that authorized users are permitted to execute. | According to DFARS, you need to:<br>• Identify the transactions and functions that authorized users are permitted to perform<br>• Configure the system to only allow the execution of those identified transactions/functions | 10/15/2019 | Yes ○<br>No ○<br>N/A ○<br>Alternate Approach ○<br>Unknown ○<br>Assistance ○ | |

Fig. 28

| Security Requirement | Risk Levels | | Confidence Level | Evidence Collection | | | Evidence Review | |
|---|---|---|---|---|---|---|---|---|
| | DoD | Alt. | | Self-Collected | Third-Party Collected | Auto-Collected | Self-Reviewed | Third-Party Reviewed |
| 3.1.1 Limit system access to authorized users, processes acting on behalf of authorized users, and devices (including other systems). | 5 | 5 | 4 | ○ | ○ | ◉ | ◉ | ○ |
| 3.1.2 Limit system access to the types of transactions and functions that authorized users are permitted to execute. | 5 | 5 | 5 | ○ | ○ | ◉ | ○ | ◉ |
| 3.1.3 Control the flow of CUI in accordance with approved authorizations. | 5 | 5 | 1 | ◉ | ○ | ○ | ◉ | ○ |
| 3.1.4 Separate the duties of individuals to reduce the risk of malevolent activity without collusion. | 3 | 4 | 3 | ○ | ◉ | ○ | ○ | ◉ |
| 3.1.5 Employ the principle of least privilege, including for specific security functions and privileged accounts. | 4 | 4 | 1 | ◉ | ○ | ○ | ◉ | ○ |
| 3.1.6 Use non-privileged accounts or roles when accessing nonsecurity functions. | 4 | 4 | 2 | ◉ | ○ | ○ | ○ | ◉ |
| 3.1.7 Prevent non-privileged users from executing privileged functions and capture the execution of such functions in audit logs. | 5 | 5 | 1 | ◉ | ○ | ○ | ◉ | ○ |
| 3.1.8 Limit unsuccessful logon attempts. | 3 | 4 | 1 | ◉ | ○ | ○ | ◉ | ○ |
| 3.1.9 Provide privacy and security notices consistent with applicable CUI rules. | 3 | 3 | --- | ○ | ○ | ○ | ○ | ○ |

Fig. 29

| Supplier A | | | | |
|---|---|---|---|---|
| Pending Requests from Buyers | | | | |
| Buyer | Requirement | Request Date | Response Due Date | Implementation Due Date |
| | | | | |
| Accepted Requests from Buyers | | | | |
| Buyer | Requirement | Request Date | Response Due Date | Implementation Due Date |
| Buyer A | NIST SP 800-171, Rev. 1 | 01/01/2019 | 01/01/2020 | 01/01/2020 |

| Compliance Attestation Response Status | | | |
|---|---|---|---|
| NIST SP 800-171, Rev. 1 | | | |
| Section | Total # Questions | # Questions Answered | % Complete |
| 3.1 | 22 | 15 | 68 |
| 3.2 | 3 | 3 | 100 |
| 3.3 | 9 | 6 | 67 |
| 3.4 | 9 | 8 | 89 |
| 3.5 | 11 | 11 | 100 |
| 3.6 | 3 | 2 | 67 |
| 3.7 | 6 | 5 | 83 |
| 3.8 | 9 | 4 | 44 |
| 3.9 | 2 | 2 | 100 |
| 3.10 | 6 | 3 | 50 |
| 3.11 | 3 | 3 | 100 |
| 3.12 | 4 | 4 | 100 |
| 3.13 | 16 | 10 | 63 |
| 3.14 | 7 | 5 | 71 |

Fig. 30

SYSTEMS AND METHODS FOR MANAGING AND MONITORING CONTINUOUS ATTESTATION OF SECURITY REQUIREMENTS

CLAIM OF PRIORITY

This application is a continuation under 35 U.S.C. 120 of prior U.S. application Ser. No. 16/571,024, filed Sep. 13, 2019, the disclosure of which is incorporated herein by reference in its entirety for all purposes.

BACKGROUND

The federal government contracts with external service/product providers to perform a wide range of functions. These external service/product providers are commonly referred to as federal contractors. It is common for federal contractors to process, store, and transmit unclassified information that is deemed sensitive by the federal government in order to provide services/products. For example, unclassified sensitive information may include or be associated with credit card data, financial services data, Internet services, electronic mail services, background check information, healthcare data, cloud services, communication services, satellite operations, weapon systems, among many others. The protection of both classified information and unclassified sensitive information is of high importance to federal agencies.

U.S. Presidential Executive Order 13556, dated Nov. 4, 2010, entitled "Controlled Unclassified Information," established a Controlled Unclassified Information (CUI) Program to standardize the way that the executive branch handles unclassified information. CUI refers to information that requires safeguarding or dissemination controls pursuant to federal law, regulation, and/or government policy. The National Institute of Standards and Technology (NIST) issued NIST Special Publication 800-171, Revision 1, dated December 2016, entitled "Protecting Controlled Unclassified Information in Nonfederal Systems and Organizations," (referred to as "NIST 800-171" hereafter) to provide federal agencies with recommended security requirements for protecting the confidentiality of CUI. NIST 800-171 states that the recommended security requirements are applicable "when the CUI is resident in a nonfederal system and organization; when the nonfederal organization is not collecting or maintaining information on behalf of a federal agency or using or operating a system on behalf of an agency; and where there are no specific safeguarding requirements for protecting the confidentiality of CUI prescribed by the authorizing law, regulation, or government-wide policy for the CUI category or subcategory listed in the CUI Registry." NIST 800-171 also states that the "security requirements apply only to components of nonfederal systems that process, store, or transmit CUI, or that provide security protection for such components." NIST 800-171 also states that the "security requirements are intended for use by federal agencies in appropriate contractual vehicles or other agreements established between those agencies and nonfederal organizations."

NIST 800-171 identifies fourteen security requirement families/sections: Access Control, Awareness and Training, Audit and Accountability, Configuration Management, Identification and Authentication, Incident Response, Maintenance, Media Protection, Personnel Security, Physical Protection, Risk Assessment, Security Assessment, System and Communication Protection, and System and Information Integrity. Each of the security requirement families/sections includes a number of basic security requirements and a number of derived security requirements. There are 110 security requirements in total across the fourteen security requirement families/sections. For example, NIST 800-171 states that the basic security requirements for the configuration management family are defined to:

Establish and maintain baseline configurations (including hardware, software, firmware, and documentation) throughout the respective system development life cycles.

Establish and enforce security configuration settings for information technology products employed in organizational systems.

NIST 800-171 also states that the derived security requirements are defined to:

Track, review, approve or disapprove, and audit changes to systems.

Analyze the security impact of changes prior to implementation.

Define, document, approve, and enforce physical and logical access restrictions associated with changes to systems.

Employ the principle of least functionality by configuring systems to provide only essential capabilities.

Restrict, disable, and prevent the use of nonessential programs, functions, ports, protocols, and services.

Apply deny-by-exception (blacklisting) policy to prevent the use of unauthorized software or deny-all, permit-by-exception (whitelisting) policy to allow the execution of authorized software.

Control and monitor user-installed software.

The federal government requires federal contractors to demonstrate to their compliance with the security requirements for protecting CUI as set forth in NIST 800-171. A federal contractor may often act as a buyer to secure products/services from one or more suppliers. Whenever CUI may be exposed to a supplier by a buyer, the buyer is responsible for ensuring that the supplier is in compliance with the security requirements for protecting CUI as set forth in NIST 800-171. It is within this context that the present invention arises.

SUMMARY

In an example embodiment, a system for implementing a continuous attestation program is disclosed. The system includes buyer portal logic controlling transmission and display of data on a buyer computing device. The buyer portal logic enables a buyer to specify a set of security requirements for attestation by a supplier. The system also includes supplier portal logic controlling transmission and display of data on a supplier computing device. The system also includes attestation program logic enabling a supplier to define a continuous attestation program for the set of security requirements through a supplier interface provided by the supplier portal logic. The continuation attestation program includes an annual attestation program and a sub-annual attestation program. The system also includes attestation data collection logic operating to receive compliance attestation responses from the supplier for the set of security requirements and correlate the compliance attestation responses to the continuous attestation program for the supplier. The system also includes attestation sharing logic enabling the supplier to specify an access privilege for the buyer through the supplier interface provided by the supplier portal logic. The access privilege allows the buyer to access and view either annual continuous attestation program data for the supplier or both annual and sub-annual attestation program data for the supplier. The system also includes supplier evaluation logic automatically generating evaluation metrics for the supplier in real-time based on: the continuous attestation program for the supplier, and the compliance attestation responses received from the supplier, and a set of risk levels respectively corresponding to the set of security requirements. The evaluation metrics include an overall risk level for the supplier. The supplier evaluation logic exposes in real-time the overall risk level for the supplier to the buyer through the buyer portal logic in accordance with the access privilege for the buyer.

In an example embodiment, a method is disclosed for implementing a continuous attestation program. The method includes establishing a buyer account for a buyer in a cloud-based system. The method also includes establishing a supplier account for a supplier in the cloud-based system. The method also includes transmitting a compliance request from the buyer account to the supplier account. The compliance request specifies a set of security requirements for attestation by the supplier. The method also includes receiving an indication of acceptance of the compliance request through the supplier account. The method also includes receiving data defining a continuous attestation program for the supplier for the set of security requirements through the supplier account. The continuation attestation program includes an annual attestation program and a sub-annual attestation program. The method also includes receiving compliance attestation responses from the supplier through the supplier account for the set of security requirements. The method also includes correlating the compliance attestation responses to the continuous attestation program for the supplier. The method also includes receiving specification of an access privilege for the buyer through the supplier account. The access privilege allows the buyer to access and view either annual continuous attestation program data for the supplier or both annual and sub-annual attestation program data for the supplier. The method also includes generating evaluation metrics for the supplier automatically and in real-time based on: the continuous attestation program for the supplier, the compliance attestation responses received from the supplier, the process used to collect and evaluate evidence for the attestation responses, and a set of risk levels respectively corresponding to the set of security requirements. The evaluation metrics include an overall risk level for the supplier. The method also includes exposing in real-time the overall risk level for the supplier to the buyer through the buyer account in accordance with the access privilege for the buyer.

Other aspects and advantages of the invention will become more apparent from the following detailed description, taken in conjunction with the accompanying drawings, illustrating by way of example the present invention.

BRIEF DESCRIPTION OF THE DRAWINGS

FIG. 6 shows an example selectable interface of the buyer portal interface through which a user of the buyer can either associate a supplier account with the buyer account or create a new supplier account for association with the buyer account, in accordance with some embodiments of the invention.

FIG. 7 shows an example selectable interface of the buyer portal interface through which a new user of the buyer can be created, in accordance with some embodiments of the invention.

FIG. 10 shows an example selectable interface of the buyer portal interface listing each supplier account that is associated with the buyer account and that has been assigned a particular security requirement set, in accordance with some embodiments of the invention.

FIG. 11 shows an example selectable interface of the buyer portal interface listing each supplier account that is associated with the buyer account and showing how many security requirement sets have been assigned to each supplier account by the buyer account, in accordance with some embodiments of the invention.

FIG. 14 shows an example selectable interface of the buyer portal interface that displays details of a given security requirement compliance attestation response, in accordance with some embodiments.

FIG. 20 shows an example selectable interface of the buyer portal interface that displays a supplier compliance summary table for the buyer account, in accordance with some embodiments.

FIG. 21 shows an example selectable interface of the buyer portal interface that displays a supplier group compliance summary table for the buyer account, in accordance with some embodiments.

FIG. 22 shows an example selectable interface of the supplier portal interface through which supplier account information can be updated, in accordance with some embodiments of the invention.

FIG. 23 shows an example selectable interface of the supplier portal interface through which the supplier account can grant access privilege to and remove access privilege from each buyer account to which the supplier account is associated, in accordance with some embodiments.

FIG. 24 shows an example selectable interface of the supplier portal interface through which a new user of the supplier can be created and edited, in accordance with some embodiments of the invention.

FIG. 25 shows an example selectable interface of the supplier portal interface through which the annual attestation program for the supplier can be defined, in accordance with some embodiments.

FIG. 26 shows an example selectable interface of the supplier portal interface through which the sub-annual attestation program for the supplier can be defined, in accordance with some embodiments.

FIG. 27 shows an example selectable interface of the supplier portal interface through which the supplier can provide response to a required set of questions, in accordance with some embodiments.

FIG. 28 shows an example selectable interface of the supplier portal interface through which the supplier can provide attestation responses to a specified security requirement set, in accordance with some embodiments.

FIG. 29 shows an example selectable interface of the supplier portal interface through which the supplier can specify how evidence was collected and reviewed to support the supplier's attestation responses to the specified security requirement set, in accordance with some embodiments.

FIG. 30 shows an example selectable interface of the supplier portal interface that provides an overview of the continuous-real-time supplier compliance status for the supplier account, in accordance with some embodiments.

DETAILED DESCRIPTION

Figure 1:
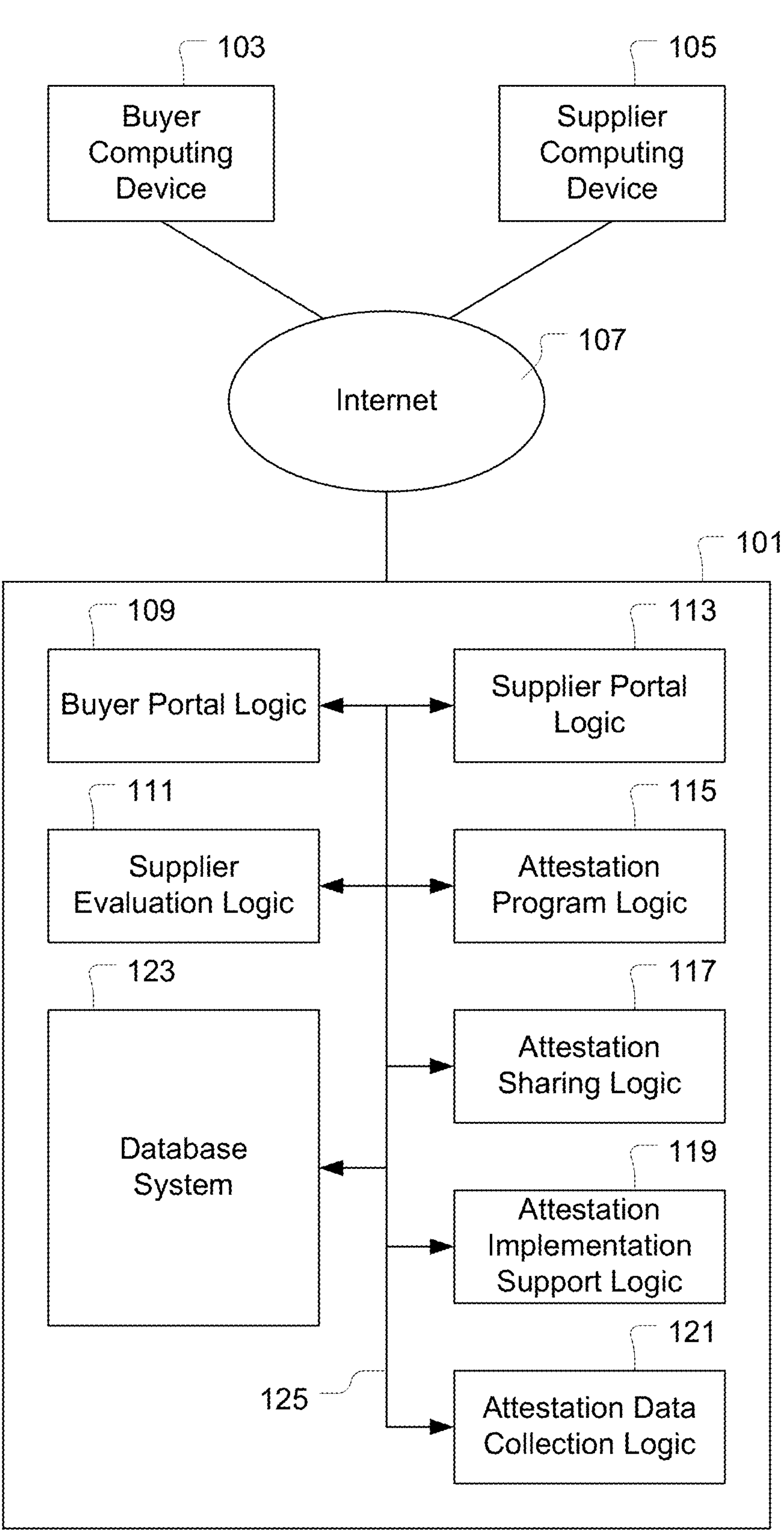
FIG. 1 shows a diagram of a system for managing, monitoring, and evaluating buyer and supplier activities with regard to security requirement attestation, in accordance with some embodiments.

In the following description, numerous specific details are set forth in order to provide an understanding of the present invention. It will be apparent, however, to one skilled in the art that the present invention may be practiced without some or all of these specific details. In other instances, well known process operations have not been described in detail in order not to unnecessarily obscure the present invention.

The term "buyer" as used herein refers to an entity that is required to demonstrate to the federal government, or relevant customer, that a supplier in the buyer's supply chain is in compliance with the security requirements set forth by the federal government for protecting the confidentiality of CUI, such as the security requirements of NIST 800-171. The term "supplier" as used herein refers to an entity that is contracted to provide services/products to a buyer, where the supplier is engaged in handling CUI as part of providing the services/products to the buyer. Depending on the configuration of the buyer's supply chain, the buyer can have one or more suppliers for securing various services/products. As part of their engagement with the supplier, the buyer sends a compliance attestation request to the supplier, where the compliance attestation request requires the supplier to provide attestation of the supplier's compliance with a required set of security requirements for protecting the confidentiality of CUI, such as the security requirements of NIST SP 800-171, Revision 1. The supplier accepts the compliance attestation request from the buyer, presumably as part of consummating the supplier's business engagement with the buyer. Once the supplier accepts the compliance attestation request from the buyer, the supplier is responsible for providing timely attestation responses to questions regarding the supplier's compliance with the required set of security requirements. Each question regarding the supplier's compliance with a particular security requirement can have its own attestation schedule, which sets a recurring due date by which the supplier must provide the supplier's compliance attestation response for the question.

Some government agencies, such as the Department of Defense, among others, require contractors and sub-contractors to implement cybersecurity requirements. As a supplier, when you look at attestations for a number N of security requirements (where N seems to keep growing), you look at each one of the security requirements and attest as to whether or not you have implemented/completed the security requirement, or identify whether or not there is a problem with implementing the security requirement. This allows the supplier to know where they stand with regard to satisfying the security requirements. This also allows the buyer, that contracts with the supplier, to know where the supplier stands with regard to satisfying the security requirements. It should be understood that the buyer can be contracting to procure essentially anything, e.g., hardware, software, research, services, etc.

Typically, the buyer is ultimately responsible for ensuring the security of assets that the buyer provides to a supplier as part of establishing and fulfilling a contract between the buyer and the supplier. Therefore, the buyer has a strong interest in specifying to the supplier the security requirements that must be complied with by the supplier, and in ensuring that the security requirements are complied with on a timely and continuous basis by the supplier. In some cases, a supplier contract may specify that the supplier is required to implement and maintain certain security requirements to protect some asset(s) that will be in the custody of the supplier during their work on the contract. The terms of the supplier contract may require the supplier to track these required security requirements and provide attestation on a prescribed schedule as to whether or not the security requirements are implemented/completed by the supplier. A sub-contractor supplier may inherit security requirements from a buyer who is also a sub-contractor supplier. In this case, each entity will be required to track the security requirements and provide attestation on a prescribed schedule as to whether or not the supplier is in compliance with the security requirements. An example set of 110 security requirements is listed in NIST SP 800-171, Revision 1, which is incorporated herein by reference in its entirety for all purposes. It should be understood, however, that the security requirements specified by the buyer that must be complied with by the supplier can be essentially any set of security requirements. And, in some cases, the buyer can require the supplier to comply with multiple different sets of security requirements and/or provide responses to questions outside of a formal security requirement specification.

Systems and methods are disclosed herein for managing, monitoring, and evaluating buyer and supplier activities with regard to security requirement attestation. FIG. 1 shows a diagram of a system 101 for managing, monitoring, and evaluating buyer and supplier activities with regard to security requirement attestation, in accordance with some embodiments. The system 101 provides a tool that is backed by a database system 123 to provide for specification of supplier security requirements and to provide for real-time, continuous tracking/monitoring of supplier compliance with the supplier security requirements. The system 101 is accessible and usable by both the buyer and the supplier over the Internet 107. In this manner, there is a buyer/supplier relationship in the system 101. In some embodiments, the system 101 is implemented as a cloud-based computing system.

In general, the security requirements for a supplier are specified for the environment in which the work is performed by the supplier. For example, consider that Company A is hiring Company B to develop a product. In order for Company B to develop the product, Company A must provide company B with some protected information, which company A is responsible for keeping secure in accordance with a specified set of security requirements. Before Company A provides the protected information to Company B, it is necessary for Company B to attest that the protected information will be handled in compliance with the specified set of security requirements. So, it should be understood that it is not necessarily the product that is being developed that must be secured, but rather the environment in which the product is being developed that must be secured in order to ensure the security of the protected information required to develop the product. In some cases, however, the product that is being developed may also need to be secured. The system 101 provides for specification of security requirements for a supplier's environment (i.e., the environment under the control of the supplier) and provides for continuous, real-time monitoring of the supplier's compliance with those security requirements. The system 101 provides an interface through which the supplier can attest to whether or not they are in compliance with each of the specified security requirements. The status of a supplier's attestations of compliance with the specified security requirements can be viewed by both the supplier and the buyer. The system 101 provides for continuous attestation of supplier compliance with security requirements, where continuous attestation refers to the supplier having to attest on a specified schedule (e.g., yearly, quarterly, monthly, weekly, daily, etc.) that they are in compliance with particular security requirements. The system 101 allows the supplier to provide their buyer with either real-time access to the supplier's security requirement attestation data, or with periodic, e.g., annual, access to the supplier's security requirement attestation data. The system 101 automatically and continuously tracks which security requirements have and have not been complied with by the supplier at a given time and conveys this compliance status information to the buyer in real-time.

The system 101 allows the buyer to find and select any of their multiple suppliers in order to view the currently selected supplier's compliance with their security requirements. Also, each of the security requirements can have an associated risk level. So, when a supplier is not in compliance with a given security requirement, the risk level associated with the given security requirement is weighed/considered in evaluating an overall risk level for use of the supplier by the buyer. Through the system 101, the buyer can monitor the overall risk level of the supplier to make informed decisions about using the supplier and/or implementing a corrective action plan with the supplier. Also, through the system 101, the buyer can monitor the supplier's compliance with individual security requirements and see the risk level associated with the individual security requirements to make informed decisions about using the supplier and/or implementing a corrective action plan with the supplier.

The system 101 is connected through the Internet 107 to a buyer computing device 103 and to a supplier computing device 105. The system 101 includes buyer portal logic 109 configured to control transmission of data to the buyer computing device 103 and display of data on the buyer computing device 103. The buyer portal logic 109 is connected through a data communication network 125 to access data from and write data to a database system 123. The system also includes supplier portal logic 113 configured to control transmission of data to the supplier computing device 105 and display of data on the supplier computing device 105. The supplier portal logic 113 is connected through the data communication network 125 to access data from and write data to the database system 123.

The system 101 also includes supplier evaluation logic 111 configured to generate evaluation metrics regarding a supplier's compliance with security requirements. The supplier evaluation logic 111 is connected through the data communication network 125 to access data from and write data to the database system 123. The supplier evaluation logic 111 computes metrics on the collected attestation information. The supplier evaluation logic 111 in combination with the buyer portal logic 109 provides for transmission of metrics computed on the collected attestation information to the buyer, thereby enabling the buyer to make risk-based decisions on use of the supplier. The evaluation metrics are accessible from the database system 123 by the buyer portal logic 109 for transmission to the buyer's computing device 103.

It should be understood that generation of the evaluation metrics by the supplier evaluation logic 111 is done automatically through processing by a backend computing system that does not require user input for triggering generation of the evaluation metrics. The automatic generation of the evaluation metrics is a process that is not part of a user interface accessible by the buyer and/or the supplier. Automatic generation of the evaluation metrics is a server process that acts on data supplied by the supplier using a portion of the backend computing system that is not accessible to the supplier.

The system 101 also includes attestation program logic 115 configured to enable a supplier to define an attestation schedule (annual and/or sub-annual) for each security requirement for which they are required to make a compliance attestation. The attestation program logic 115 is connected through the data communication network 125 to access data from and write data to the database system 123. In some embodiments, the attestation program logic 115 in combination with the supplier portal logic 113 enables the supplier to visually define their continuous attestation program for satisfying their annual and sub-annual attestation reporting needs.

The system 101 also includes attestation sharing logic 117 configured to enable a supplier to control how the supplier's attestations are viewed by the buyer. For example, the attestation sharing logic 117 can be used by a supplier to limit a buyer's access to only the supplier's annual attestation data, or can be used by a supplier to allow a buyer access to both the supplier's annual and sub-annual attestation data. The attestation sharing logic 117 is connected through the data communication network 125 to access data from and write data to the database system 123. The attestation sharing logic 117 in combination with the supplier portal logic 113 enables the supplier to dynamically determine/specify which buyer(s) can view updates of the supplier's annual attestations, and separately enables the supplier to dynamically determine/specify which buyer(s) can view updates of the supplier's sub-annual attestations.

The system 101 also includes attestation implementation support logic 119 configured to keep track of when a supplier is required to make compliance attestations for security requirements and provide corresponding notifications to the supplier. The attestation implementation support logic 119 is connected through the data communication network 125 to access data from and write data to the database system 123. The attestation implementation support logic 119 in combination with the supplier portal logic 113 provides for notifying the users of the supplier of when attestations are due, thereby supporting implementation of the supplier-defined continuous attestation program.

The system 101 also includes attestation data collection logic 121 configured to collect compliance attestation response data from the supplier and correlate the collected attestation response data with appropriate security requirements. The attestation data collection logic 121 is connected through the data communication network 125 to access data from and write data to the database system 123. The attestation data collection logic 121 in combination with the buyer portal logic 109 provides for transmission of collected attestation response information to the buyer, thereby enabling the buyer to view a current status of the supplier's compliance with the security requirements specified by the buyer.

The term "attestation" as used herein refers to a supplier's response to a question and/or security requirement compliance inquiry. The system 101 provides a continuous attestation database and management system for auditing, evaluating, and tracking of supplier attestations by the buyer (partner) and the supplier. The system 101 provides for supply chain attestation by enabling collection of supply chain data (such as information about one or more suppliers of the buyer), collecting of supply chain attestation data from the one or more suppliers of the buyer, and providing compiled supply chain information so that the attestation data is accessible to the buyer in accordance with access permissions set by each of the one or more suppliers, respectively. Using the system 101, the buyer can direct analysis, filtering, and/or organization of the compiled supply chain information. It should be understood that the buyer has independent and secure access to the system 101 through the buyer portal logic 109 by way of the buyer computing device 103 and Internet 107. Also, it should be understood that the supplier has independent and secure access to the system 101 through the supplier portal logic 113 by way of the supplier computing device 105 and Internet 107. In this manner, the buyer is only able to view and process the supplier's attestation data for which the supplier has given the buyer permission to access. Similarly, the supplier is only able to respond to security requirement attestation requests for which the supplier has been invited to respond by the buyer.

The continuous attestation program for a supplier is essentially a schedule established by the supplier for providing compliance attestation responses to the questions and/or security requirements related to protecting confidential CUI, as specified by the buyer and as accepted by the supplier. The supplier can establish separate annual and sub-annual attestation response schedules for each question and/or security requirement for which the supplier has to supply an attestation response.

Figure 2:
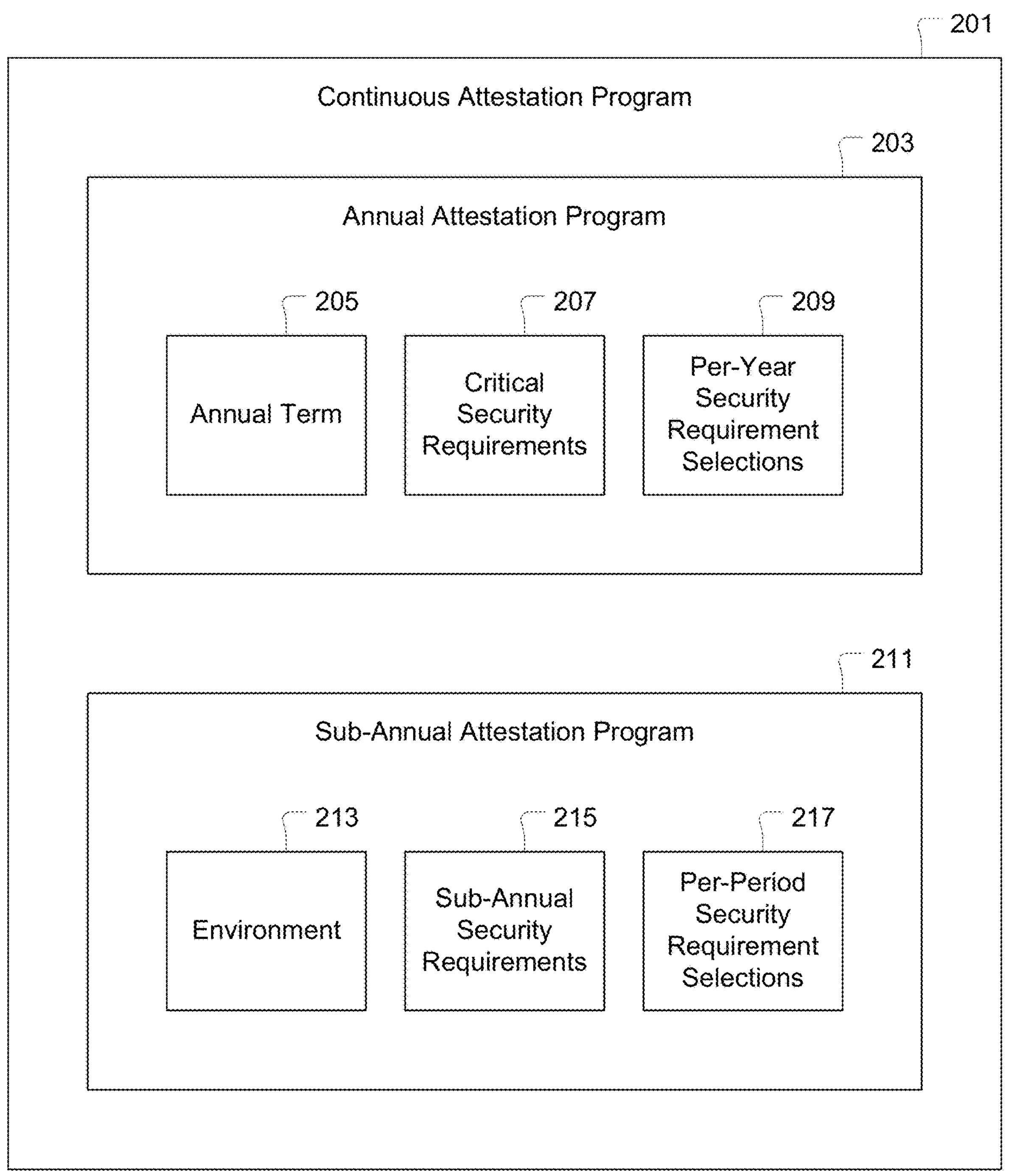
FIG. 2 shows a diagram of the continuous attestation program implemented by the attestation program logic, in accordance with some embodiments.

FIG. 2 shows a diagram of the continuous attestation program 201 implemented by the attestation program logic 115, in accordance with some embodiments. The continuous attestation program 201 includes an annual attestation program 203 and a sub-annual attestation program 211. The annual attestation program 203 defines an annual attestation schedule for the supplier to follow in providing attestation responses to the security requirements specified by the buyer. Under the annual attestation program 203, attestations of compliance with security requirements are performed by the supplier on a yearly basis. However, a given security requirement may not need to be attested to every single year. Specifically, the annual attestation program 203 specifies an annual term 205 within which attestation responses are to be provided by the supplier for the full set of security requirements specified by the buyer. The annual term 205 is a length in years in which all security requirements should be attested to at least once. In other words, the annual term 205 is the number years over which non-critical security requirements are distributed for attestation. The annual attestation program 203 provides for specification of critical security requirements 207 that must be attested to by the supplier each and every year. The balance of the specified security requirements, i.e., those specified security requirements that are not critical security requirements 207, are then spread out over the annual term 205 so that the balance of the specified security requirements are attested to at least once during the annual term 205, albeit on an annual basis. The annual attestation program 203 provides for specification of per-year security requirement selections 209, which is a specification of which ones of the non-critical security requirements will be attested to by the supplier in which years of the annual term 205.

As an example, consider that there are 110 security requirements that have to be collectively responded to by the supplier over an annual term 205 of three years, and there are no critical security requirements 207. For this example, the per-year security requirement selections 209 may be specified to set attestation responses for security requirements 1-37 due by the end of year one of the three year annual term 205, and to set attestation responses for security requirements 38-74 due by the end of year two of the three year annual term 205, and to set attestation responses for security requirements 75-110 due by the end of year three of the three year annual term 205. As another example, consider that there are 110 security requirements, where security requirements 1-11 are specified as critical security requirements 207 that have to be responded to by the supplier each year, and where security requirements 12-110 have to be collectively responded to by the supplier at least once over a three year annual term 205. For this example, the per-year security requirement selections 209 may be specified to set attestation responses for security requirements 12-44 due by the end of year one of the three year annual term 205, and to set attestation responses for security requirements 45-77 due by the end of year two of the three year annual term 205, and to set attestation responses for security requirements 78-110 due by the end of year three of the three year annual term 205. Therefore, in this example, attestation responses for security requirements 1-11 and 12-44 are due by the end of year one of the three year annual term 205, and attestation responses for security requirements 1-11 and 45-77 are due by the end of year two of the three year annual term 205, and attestation responses for security requirements 1-11 and 78-110 are due by the end of year three of the three year annual term 205.

The sub-annual attestation program 211 defines an attestation schedule for security requirements that must be attested to by the supplier more frequently than once per year. The sub-annual attestation program 211 provides for specification of environment parameters 213 that when present trigger implementation of the sub-annual attestation program 211. For example, some environment parameters 213 can include an identifier of the supplier, an environmental characteristic of the supplier, a specific requirement for a buyer, or any combination thereof, among others. In general, the environment parameters 213 specify the type of environment in which the supplier conducts their operations. For example, the environment parameters 213 for a supplier may specify whether or not the supplier has an enclave environment and/or specify a geographic location of the supplier, among other parameters. The environment parameters 213 can be used as inputs to risk management computations. The sub-annual attestation program 211 also provides for specification of sub-annual security requirements 215, which identifies the security requirements that must be attested to by the supplier on a sub-annual basis. The sub-annual attestation program 211 also provides for specification of per-period security requirement selections 217, which identifies the security requirements that must be attested to by the supplier in accordance with each type of sub-annual period, where the types of sub-annual periods include a semi-annual period (attestation once per six months), a quarterly period (attestation once per three months), a monthly period (attestation once per month), and a weekly period (attestation once per week). In some embodiments, the types of sub-annual periods can include other periods, such as daily (attestation once per day), or bi-weekly (attestation every other week), among others.

The continuous attestation program for a supplier is likely to be different for different suppliers. Because of this variability, the attestation program logic 115 is configured to enable users of the supplier to visually define their individual continuous attestation program 201, including their annual attestation program 203 and their sub-annual attestation program 211, by way of the supplier portal logic 113. The attestation sharing logic 117 is configured to enable the supplier to share one or both of their annual attestation program 203 and sub-annual attestation program 211 with the supplier's buyer(s), by way of the buyer portal logic 109. In this manner, the buyer of the supplier is able to review and understand the supplier's continuous attestation program 201, and provide feedback to the supplier as needed, such as a feedback request for the supplier to modify a portion of the supplier's continuous attestation program 201 to be more suitable for the buyer's needs. More specifically, if the supplier's continuous attestation program 201 (annual attestation program 203 and/or sub-annual attestation program 211) is not consistent with the buyer's requirements, the buyer can contact the supplier to discuss the buyer's particular requirements.

The attestation sharing logic 117 in conjunction with the supplier portal logic 113 provides the supplier with an ability to dynamically adjust a buyer's privilege/access level, where the buyer's privilege/access level determines which information of the supplier can be viewed by the buyer. In some embodiments, the buyer's privilege/access level can be set by the supplier to either allow or disallow the buyer to view the supplier's continuation attestation program 201, the supplier's responses to their annual attestation program 203, the supplier's responses to their sub-annual attestation program 211, and metrics calculated based on the supplier's attestation responses. For example, using the buyer's privilege/access level as defined by the supplier and the supplier's responses to their annual attestation program 203 and/or sub-annual attestation program 211, the supplier evaluation logic 111 computes a confidence level metric for the supplier and a likelihood of exposure metric for the supplier. The likelihood of exposure metric is computed by analyzing each security requirement's importance in preventing exposure of sensitive data (such as CUI) in combination with the supplier's attestation responses to each security requirement. In accordance with the buyer's privilege/access level, the buyer portal logic 109 provides the buyer with a visual display on the buyer's computing device 103 that includes a visual display of the supplier's continuation attestation program 201, a visual display of the supplier's attestation responses, and a visual display of the metrics computed for the supplier. The buyer is able to use this information to make a risk-based decision on whether or not to use the supplier when sharing of sensitive information (such as CUI) with the supplier is required.

Figure 3:
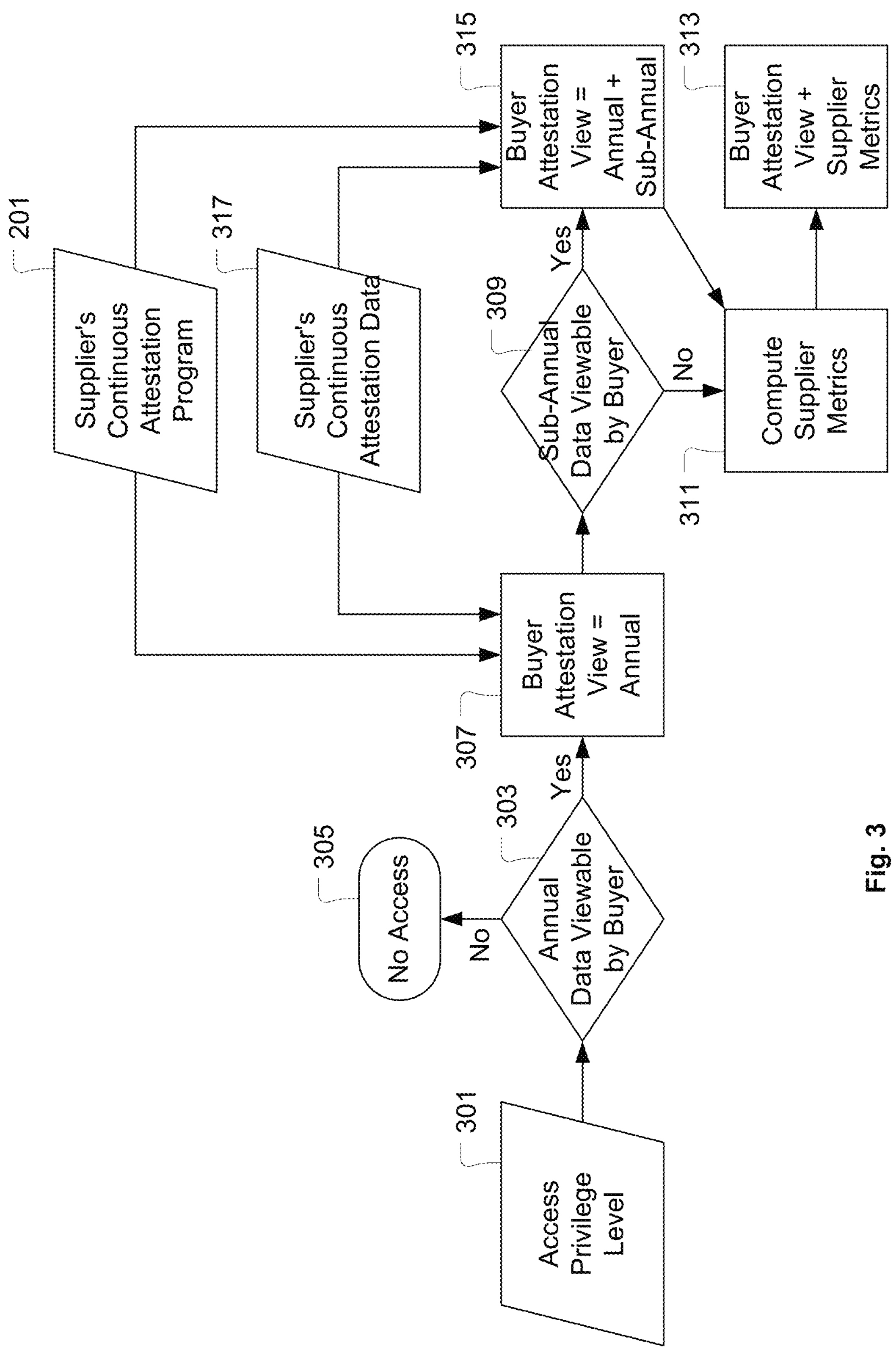
FIG. 3 shows a flowchart of a method of operation of the attestation sharing logic to implement the buyer's privilege/access level feature, in accordance with some embodiments.

FIG. 3 shows a flowchart of a method of operation of the attestation sharing logic 117 to implement the buyer's privilege/access level feature, in accordance with some embodiments. The buyer's privilege/access level as assigned by the supplier is represented as an input 301. The attestation sharing logic 117 performs a decision operation 303 to determine whether or not buyer's privilege/access level gives the buyer access to the supplier's annual attestation program 203. If the response to the decision operation 303 is no, the method concludes with an operation 305 to deny the buyer access to the supplier's data. If the response to the decision operation 303 is yes, the method proceeds with an operation 307 to release the supplier's annual attestation program 203 data to the buyer portal logic 109 to be viewable by the buyer. The operation 307 uses the supplier's annual attestation program 203 from the supplier's continuous attestation program 201 as input. The operation 307 also uses an annual compliance portion of the supplier's continuous attestation data 317 as input.

From the operation 307, a decision operation 309 is performed to determine whether or not buyer's privilege/access level gives the buyer access to the supplier's sub-annual attestation program 211. If the response to the decision operation 309 is yes, the method proceeds with an operation 315 to release the supplier's sub-annual attestation program 211 data to the buyer portal logic 109 to be viewable by the buyer, along with the supplier's annual attestation program 203 data. The operation 315 uses the supplier's sub-annual attestation program 211 from the supplier's continuous attestation program 201 as input. The operation 315 also uses a sub-annual compliance portion of the supplier's continuous attestation data 317 as input. If the response to the decision operation 309 is no, the supplier's sub-annual attestation program 211 data is not released to the buyer portal logic 109 and the method proceeds to an operation 311 in which the supplier evaluation logic 111 operates to compute supplier metrics. Also, if the method proceeds to the operation 311 from the decision operation 309, the supplier evaluation logic 111 will compute supplier metrics using the supplier's annual attestation program 203 data. If the method proceeds to the operation 311 from the operation 315, the supplier evaluation logic 111 will compute supplier metrics using both the supplier's annual attestation program 203 data and the supplier's sub-annual attestation program 211 data. From the operation 311, the method proceeds with an operation 313 in which the supplier metrics computed by the supplier evaluation logic 111 are provided to the buyer portal logic 109 for display to the buyer by way of the buyer computing device 103. As shown in the method of FIG. 3, if a buyer has access to the supplier's sub-annual attestation program 211, the buyer automatically has access to the supplier's annual attestation program 203.

Keeping track of when the supplier needs to validate that a security requirement is operating correctly and attest to proper operation of the security requirement can become burdensome and confusing, especially considering that each security requirement can potentially have a different attestation schedule (sub-annual or annual). To ease the burden on the supplier, the attestation implementation support logic 119 uses the defined continuous attestation program 201 to create electronic notices (e.g., email notices) that are transmitted to one or more users of the supplier, where the electronic notices provide notification that one or more specific security requirements need to be assessed by the supplier. Also, the attestation implementation support logic 119 in conjunction with the supplier portal logic 113 identifies which specific security requirements need to be assessed by the supplier when the supplier accesses the system 101.

Figure 4:
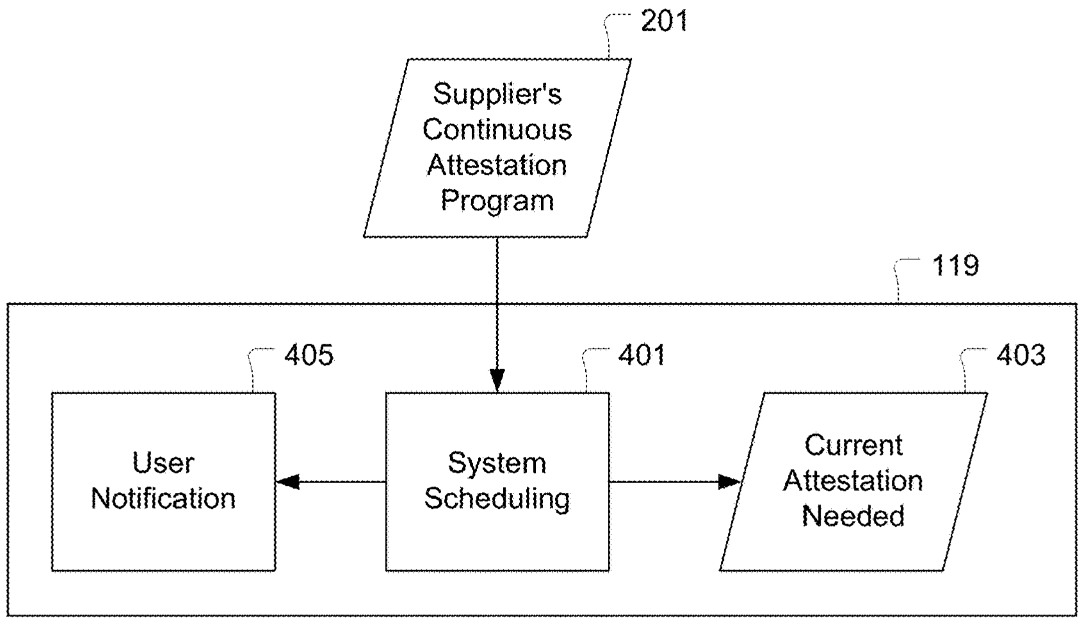
FIG. 4 shows a logic diagram of the attestation implementation support logic, in accordance with some embodiments.

FIG. 4 shows a logic diagram of the attestation implementation support logic 119, in accordance with some embodiments. The attestation implementation support logic 119 includes system scheduling logic 401 that receives the supplier's continuous attestation program 201 as input and determines an attestation schedule for each security requirement. The attestation implementation support logic 119 also includes user notification logic 405 to generate and transmit the electronic notices to the supplier that one or more specific security requirements need to be addressed by the supplier. The attestation implementation support logic 119 also includes current attestation needed logic 403 for instructing the supplier portal logic 113 as to which security requirements need to be identified as requiring assessment by the supplier when the supplier accesses the system 101.

Collection of data for the supplier's annual and/or sub-annual attestations and association of the collected data to the appropriate time period in accordance with the annual attestation program 203 and/or sub-annual attestation program 211, as the case may be, is necessary for the supplier and the buyer to understand the security posture of the supplier at any given time. In general, the buyer is usually interested in the current security posture of the supplier. However, the supplier may be interested in the supplier's previous security postures to facilitate understanding the supplier's security compliance trajectory. The system 101 provides a data management capability than includes collecting, storing, processing, and presenting data about the supplier's annual and/or sub-annual attestations to enable understanding of the supplier's current security posture (for the benefit of both the buyer and supplier) and to enable understanding of the supplier's historical security posture (for the benefit of the supplier).

Figure 5:
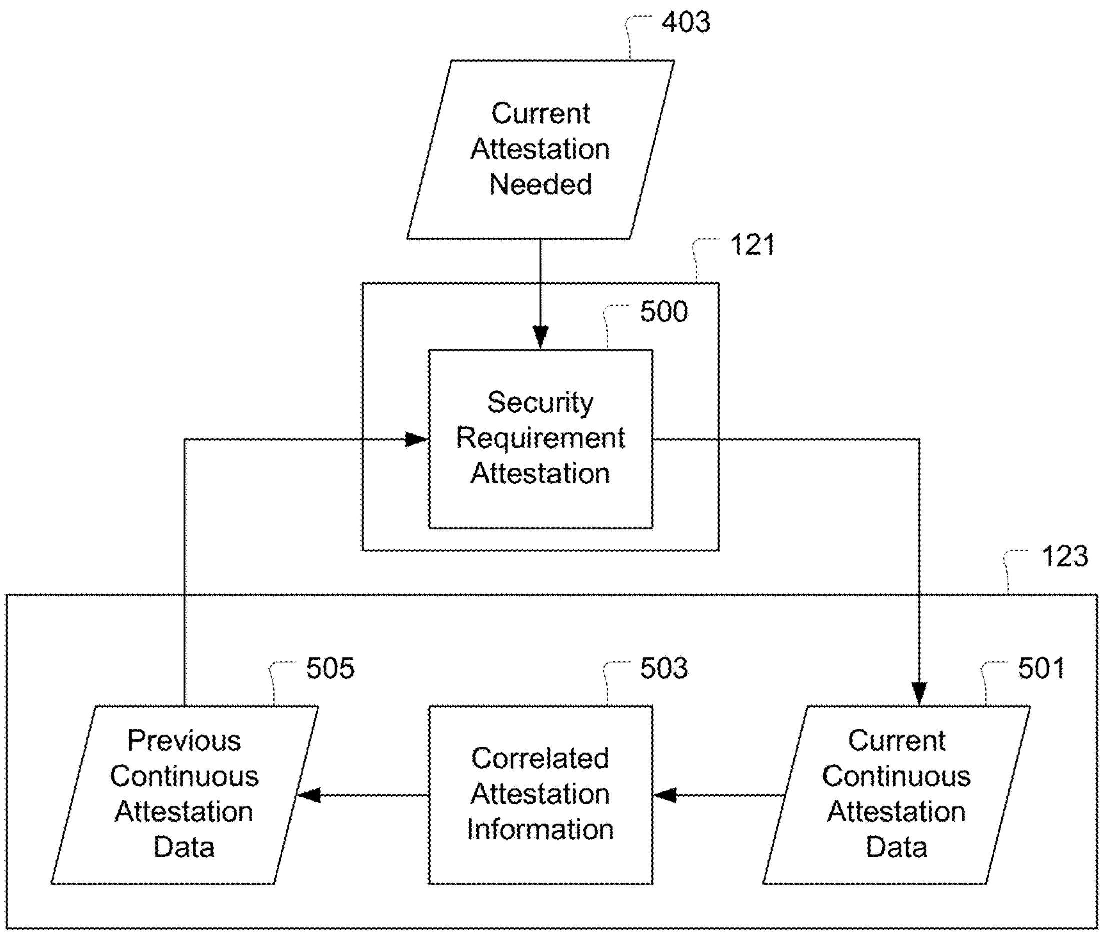
FIG. 5 shows a diagram for collection and correlation of supplier attestation data, in accordance with some embodiments.

FIG. 5 shows a diagram for collection and correlation of supplier attestation data, in accordance with some embodiments. The current attestation needed logic 403 instructs the supplier portal logic 113 to identify which security requirements need to be addressed by the supplier. The attestation data collection logic 121 is defined to receive a security requirement attestation 500 from the supplier by way of the supplier portal logic 113, where each security requirement attestation 500 is for a particular security requirement that may be one or both of the annual attestation program 203 and the sub-annual attestation program 211. The security requirement attestation 500 is included in the current continuous attestation data 501 stored in the database system 123. The current continuous attestation data 501 for a given security requirement is correlated to the attestation program (one or both of the annual attestation program 203 and the sub-annual attestation program 211) that applies to the given security requirement to generate correlated attestation information 503 that is stored in the database system 123. The correlated attestation information 503 is combined with the previous continuous attestation data 505, and both the correlated attestation information 503 and the previous continuous attestation data 505 are presented to the supplier by the attestation data collection logic 121. More specifically, during entry of the security requirement attestation 500 by the supplier, the previous continuous attestation data 505 is presented to the supplier even when attestation is not due for some of the security requirements associated with the previous continuous attestation data 505, to provide the supplier with information on whether or not any of the previous continuous attestation data 505 has become unusable. For example, it may be possible that some current continuous attestation data 501 for a given security requirement causes some previous continuous attestation data 505 for another security requirement to become unusable. In this case, presentation of the previous continuous attestation data 505 to the supplier in conjunction with processing of the current continuous attestation data 501 will allow the supplier to see when the current continuous attestation data 501 causes any previous continuous attestation data 505 to become unusable. This process assists the supplier in complying with their duty to report security requirement non-compliances in their Plan of Action and Milestones (POA&M) document. In general, the POA&M is a document created and maintained by the supplier that includes an identification and explanation of all things that are currently wrong in the supplier's security posture, what is going to be done to fix the things that are wrong in the supplier's security posture, what the schedule is for fixing the things that are wrong in the supplier's security posture, and identification and explanation of milestones that show progress toward fixing the things that are wrong in the supplier's security posture. The POA&M document can be used by the buyer to track where the supplier is on getting their security requirement non-compliances corrected. The supplier maintains the POA&M document and updates the POA&M as the supplier's security requirement compliance conditions change. The system 101 provides for exposure of the supplier's POA&M document to the buyer through the buyer portal logic 109.

The supplier's security requirement attestation data includes but is not limited to assertions by the supplier of the operational state of each security requirement within the supplier's enterprise, an expected date for implementing any unimplemented security requirement, and a description of how the security requirement is being implemented or will be implemented as the case may be. Also, in some embodiments, the supplier's security requirement attestation data includes a compliance method attribute that identifies a process/mechanism used to collect and validate the supplier's security requirement attestation data. The compliance method attribute is used by the supplier evaluation logic 111 to determine a confidence level associated with the supplier's security requirement attestation data. The confidence level refers to the confidence in whether or not the supplier is attesting correctly/truthfully to their compliance with a given security requirement. In some embodiments, the compliance method attribute is based on review of the supplier's System Security Plan (SSP). The system 101 provides the supplier with an option of exposing their SSP to the buyer through the buyer portal logic 109. The value of the compliance method attribute for a given security requirement is based on: 1) the evidence collected to support the supplier's attestation of compliance with the given security requirement, and 2) how the evidence was reviewed to determine whether or not the supplier is in compliance with the given security requirement.

In some embodiments, the compliance method attribute can have a value in an integer range extending from 1 to 5, where 1 represents a lowest level of confidence and where 5 represents a highest level of confidence. In some embodiments, the compliance method attribute value of 1 is assigned to a given security requirement when information required to support the supplier's attestation of compliance with the given security requirement is self-collected by the supplier and is self-reviewed by the supplier or the organization's system security plan (SSP) is reviewed by a third party. In some embodiments, the compliance method attribute value of 2 is assigned to a given security requirement when information required to support the supplier's attestation of compliance with the given security requirement is self-collected by the supplier and is reviewed by a third party independent of the supplier. In some embodiments, the compliance method attribute value of 3 is assigned to a given security requirement when information required to support the supplier's attestation of compliance with the given security requirement is collected by a third party independent of the supplier and is reviewed by a third party independent of the supplier. In some embodiments, the compliance method attribute value of 4 is assigned to a given security requirement when information required to support the supplier's attestation of compliance with the given security requirement is collected through an automated collection process and is self-reviewed by the supplier. In some embodiments, the compliance method attribute value of 5 is assigned to a given security requirement when information required to support the supplier's attestation of compliance with the given security requirement is collected through an automated collection process and is reviewed by a third party independent of the supplier.

In some embodiments, the attestation data collection logic 121 is configured to support the supplier in collection of evidence to support the supplier's attestation of compliance with the security requirements, and support the supplier in review of the evidence to determine whether or not the supplier is in compliance with the security requirements. In some embodiments, the attestation data collection logic 121 works with the attestation implementation support logic 119 to assist the supplier with understanding what evidence is required to be collected and maintained to support the supplier's attestation of compliance with the security requirements, and when that evidence needs to be collected and reviewed. Also, in some embodiments, the attestation implementation support logic 119 is configured to assist the supplier with organizing evidence relative to the various security requirements, and with retrieval of appropriate evidence for a given security requirement.

Each security requirement can have a specified risk level. The risk level for a given security requirement is set based on the probability that the supplier's non-compliance with the given security requirement will cause or lead to adverse exposure of sensitive information to be protected. And, the probability that supplier's non-compliance with the given security requirement will cause or lead to adverse exposure of sensitive information is based on experience as determined by a governing agency. In some embodiments, the risk levels for the various security requirements are specified by a government agency, such as the Department of Defense, or the Department of Homeland Security, among others. The risk levels and the compliance method attribute values for the various security requirements, along with the supplier's attestation responses for the various security requirements are used by the supplier evaluation logic 111 to compute an overall risk value for the supplier that is made available to the buyer and supplier, and to compute an overall confidence level for the supplier that is made available to the buyer and supplier. The buyer may use the overall risk value for the supplier as an indicator for when to suspend or terminate use of the supplier. The buyer may use the overall confidence level for the supplier as an indicator for when to request a modification/improvement of the supplier's methods for collecting and validating evidence to support the supplier's attestations of compliance with the security requirements. It should be understood that different security requirements can have different risk levels. Therefore, the supplier's overall risk value at a given time is dependent in part on which of the security requirements is/are not complied with by the supplier at the given time. Also, in some embodiments, the supplier's overall risk value at a given time can be dependent in part on how many of the security requirements is/are not complied with by the supplier at the given time.

In some embodiments, a risk level is set for each of the security requirements that is specified by the buyer to be complied with by the supplier. For example, if NIST 800-171, Revision 1, is the set of security requirements specified by the buyer to be complied with by the supplier, each of the 110 security requirements of NIST 800-171, Revision 1, can be assigned a respective risk level. The risk level assigned to each security requirement can be a value within a specified range. For example, in some embodiments, the risk level for a given security requirements can be specified as either 1 (very low risk), 2 (low risk), 3 (moderate risk), 4 (high risk), or 5 (very high risk). In some embodiments, the supplier evaluation logic 111 can be operated to evaluate supplier risk using different sets of risk levels for the specified security requirements. For example, the supplier evaluation logic 111 can evaluate the overall risk value for a given supplier using both a proprietary set of risk levels for the specified security requirements and a government set of risk levels for the specified security requirements, so as to generate two different overall risk values for the supplier, respectively.

In some embodiments, the supplier evaluation logic 111 is configured to evaluate the overall risk value of the supplier using the risk levels assigned to the security requirements as a weighting function that is applied to the supplier's attestation data for the security requirements, which can be additionally weighted by the confidence levels associated with the supplier's attestation data for the security requirements. In some embodiments, the supplier evaluation logic 111 is configured to evaluate the overall risk value of the supplier using a high-water mark approach in which the maximum risk level among the security requirements that are not currently complied with by the supplier is used as the overall risk value for the supplier. In some embodiments, the supplier evaluation logic 111 is configured to evaluate the overall risk value of the supplier using a non-compliance count approach in which the individual risk level and number of security requirements that are not currently complied with by the supplier is used to determine the overall risk value of the supplier. The buyer may take a risk management approach in which a supplier that is not in full compliance with all specified security requirements is allowed to continue working on the contract for the buyer. For example, if the supplier is out of compliance on a few security requirements that have low risk levels, the supplier's overall risk value is still sufficiently low to allow the supplier to continue working on the contract for the buyer. It should be understood that the overall confidence level of the supplier is used to inform the reliability of the overall risk level of the supplier.

In some embodiments, the buyer portal logic 109 is configured to allow the buyer to create one or more group(s) of suppliers. For example, the buyer may have multiple contracts, with each contract having a number of different suppliers. In this example, the buyer can create a different supplier group for each of the multiple contracts. The aggregation of suppliers within a given supplier group can be monitored by the buyer with regard to overall supplier risk level and supplier attestation compliance (annual and/or sub-annual). For example, at a supplier group level view, each supplier group will show a supplier group risk level, which represents the current highest overall risk level of any supplier within the supplier group. Therefore, at the supplier group level view, the buyer is able to immediately determine whether or not any particular supplier group includes at least one supplier with an unacceptable overall risk level. In this manner, the security requirement compliance status of a given supplier group is determined by the worse case compliance status among all suppliers within the given supplier group. The buyer portal logic 109 allows the buyer to select a particular supplier group and drill-down through the suppliers within the particular supplier group to determine which individual suppliers have security requirement non-compliance issues and examine those security requirement non-compliance issues.

Additionally, the system 101 allows a given supplier's continuous attestation program 201 and corresponding attestation data to be accessed by multiple buyers. In this manner, if a supplier is working for multiple buyers that have specified overlapping security requirements, the supplier's continuous attestation program 201 and corresponding attestation data only have to be entered into the system 101 once by the supplier. If a given supplier is associated with multiple buyers in the system 101, the given supplier's continuous attestation program 201 and corresponding attestation data will be viewable by each of the multiple buyers, in accordance with the permissions that have been granted to each of the multiple buyers by the supplier. For example, consider that a given supplier is associated with a first buyer that has been given access to the supplier's annual attestation program 203 only, and is associated with a second buyer that has been given access to the supplier's sub-annual attestation program 211. In this example, the given supplier's annual attestation program 203 and corresponding attestation data will be accessible by both the first and second buyer, but the supplier's sub-annual attestation program 211 and corresponding attestation data will accessible by the second buyer but not the first buyer. It should be understood that the functionality of the system 101 to share a supplier's continuous attestation program 201 and corresponding attestation data with multiple buyers, in accordance with permissions granted to the buyers by the supplier, improves both efficiency and data coherency by having the supplier provide a single input of their continuous attestation program 201 and corresponding attestation data. Also, the functionality of the system 101 to share a supplier's continuous attestation program 201 and corresponding attestation data with multiple buyers, ensures that each of the multiple buyers is simultaneously and automatically provided with a same risk evaluation of the supplier in real-time.

An administrator of the system 101 is responsible for establishing a buyer account for the buyer within the system 101. Data for the buyer account is stored in the database system 123. The administrator of the system 101 also establishes a primary user account for the buyer account in the system 101. The administrator of the system 101 also transmits primary user credentials to the primary user of the buyer to enable the primary user of the buyer to access the buyer account in the system 101. In some embodiments, the credentials for each buyer user account, including the primary user account, include a password and a link to a third party access code generating service. In some embodiments, the third party access code generating service randomly generates a valid access code that changes with a prescribed frequency, such as every minute. Once the primary user of the buyer accesses the buyer account in the system 101, the primary user of the buyer is able to change their password and otherwise perform any buyer activities as permitted by the administrator of the system 101.

Figures 6, 7:
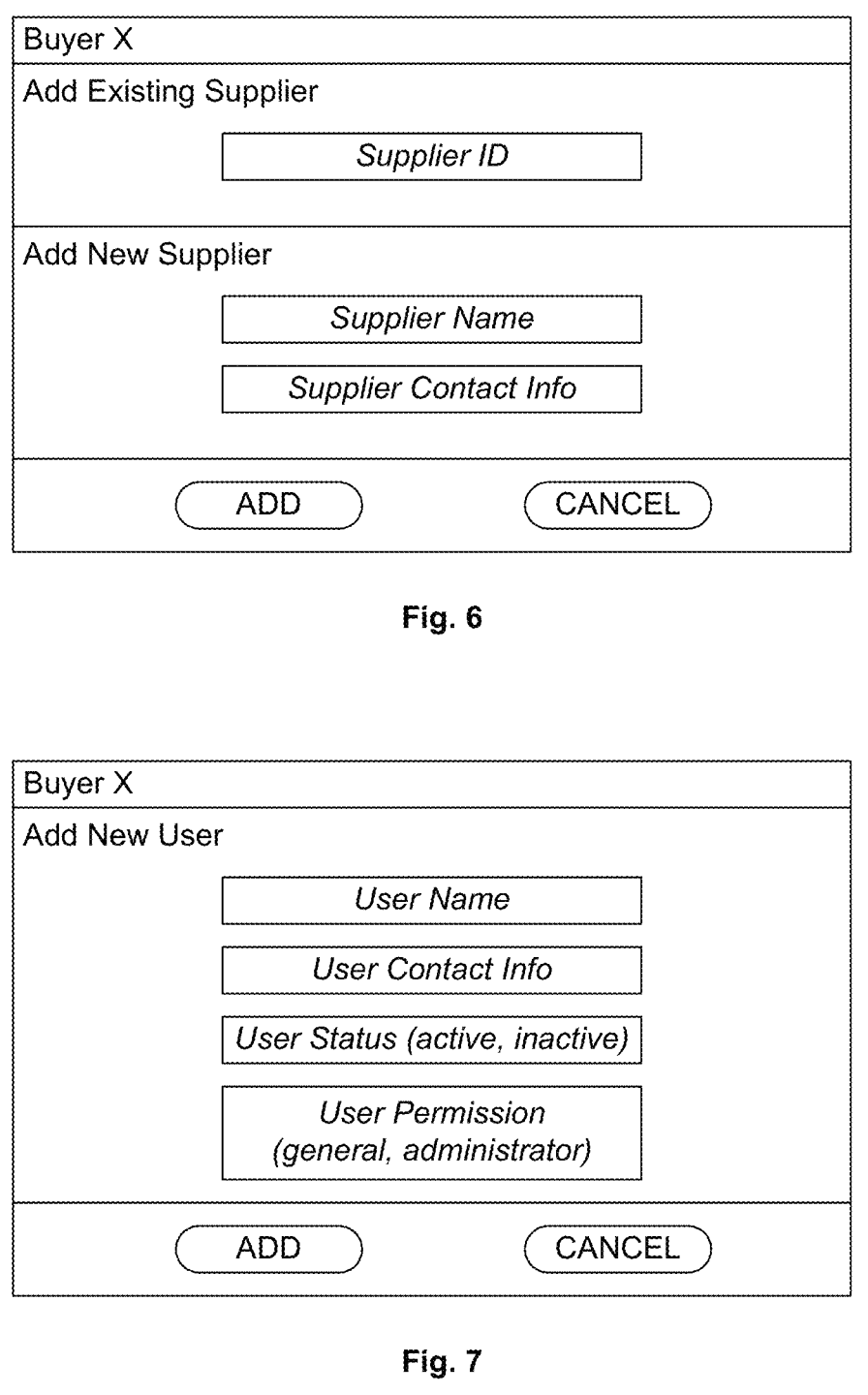

The buyer portal logic 109 generates and transmits data defining a buyer portal interface to the buyer computing device 103. Users of the buyer are able to log into the system 101 through the buyer portal interface and perform buyer activities through the buyer portal interface in accordance with permissions set for each user. FIG. 6 shows an example selectable interface of the buyer portal interface through which a user of the buyer can either associate a supplier account with the buyer account or create a new supplier account for association with the buyer account, in accordance with some embodiments of the invention. If a supplier account already exists in the system 101, the user of the buyer is able to enter the Supplier Identifier (ID) of the existing supplier account in the system 101, which causes that supplier account to be associated with the buyer account. If a new supplier account is to be created in the system 101, the user of the buyer is able to enter a Supplier Name and Supplier Contact Information (such as an email address, physical address, phone number, etc.) to create the new supplier account and cause the new supplier account to be associated with the buyer account. Upon creation of the new supplier account, the system 101 creates a supplier user account for the supplier contact. Also, the system 101 operates to transmit instructions to the supplier contact for how to access their supplier user account in the system 101. In some embodiments, the instructions to the supplier contact are transmitted in an email that provides credentials for accessing their supplier user account in the system 101. In some embodiments, the credentials for each supplier user account, including the user account for the supplier contact, include a password and a link to a third party access code generating service. In some embodiments, the third party access code generating service randomly generates a valid access code that changes with a prescribed frequency, such as every minute. It should be understood that the appearance and organization of various graphical elements, informational elements, and data entry elements of the selectable interface of FIG. 6 can vary in different embodiments of the buyer portal interface.

FIG. 7 shows an example selectable interface of the buyer portal interface through which a new user of the buyer can be created, in accordance with some embodiments of the invention. The interface of FIG. 7 provides for entry of User Name and User Contact Information (such as an email address, physical address, phone number, etc.). The interface of FIG. 7 also enables setting of a user status as either Active or Inactive. The Active status will allow the user to access the buyer account and perform activities in accordance with permissions granted to the user. The Inactive status will allow block the user from accessing the buyer account. The interface of FIG. 7 also enables setting of permissions for user. In some embodiments, the available permissions include either General or Administrator. The General permission will allow the user to access the buyer account and perform limited activities within the buyer account. For example, a user with General permission may be allowed to view supplier compliance information associated with the buyer account, but may not be allowed to create a new user for the buyer account or edit user information for the buyer account or add a new supplier for the buyer account. The Administrator permission will allow the user to perform all activities within the buyer account. It should be understood that in various embodiments, the available permissions for the user of the buyer account can include permission levels other than General and Administrator, with the different permission levels allowing the user to perform different activities within the buyer account. In some embodiments, the buyer account enables a user with administrative permission to create new permission level specifications and remove existing permission level specifications. It should be understood that the appearance and organization of various graphical elements, informational elements, and data entry elements of the selectable interface of FIG. 7 can vary in different embodiments of the buyer portal interface.

Figures 8, 9:
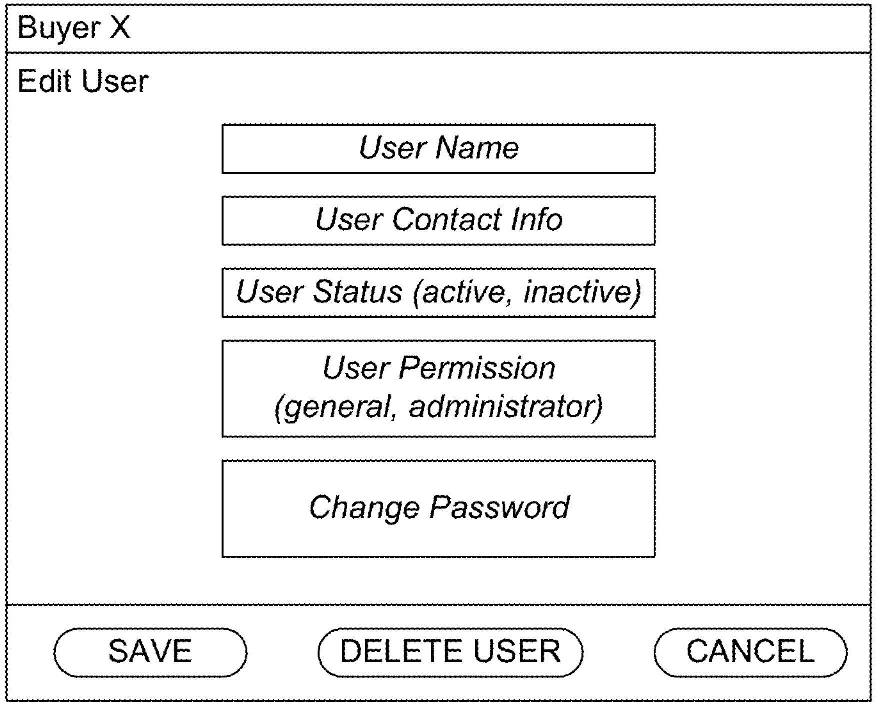
FIG. 8 shows an example selectable interface of the buyer portal interface through which an existing user of the buyer can be edited or deleted/removed, in accordance with some embodiments of the invention.
FIG. 9 shows an example selectable interface of the buyer portal interface that shows a listing of security requirement sets that have been assigned to supplier accounts associated with the buyer account, in accordance with some embodiments of the invention.

FIG. 8 shows an example selectable interface of the buyer portal interface through which an existing user of the buyer can be edited or deleted/removed, in accordance with some embodiments of the invention. The interface of FIG. 8 provides for editing of User Name and User Contact Information (such as an email address, physical address, phone number, etc.). The interface of FIG. 8 also enables changing of a user status to either Active or Inactive. The interface of FIG. 8 also enables modification of permissions for user. The interface of FIG. 8 also enables the user to change their password for accessing the buyer account within the system 101. It should be understood that the appearance and organization of various graphical elements, informational elements, and data entry elements of the selectable interface of FIG. 8 can vary in different embodiments of the buyer portal interface.

FIG. 9 shows an example selectable interface of the buyer portal interface that shows a listing of security requirement sets that have been assigned to supplier accounts associated with the buyer account, in accordance with some embodiments of the invention. The interface of FIG. 9 shows how many supplier accounts are currently associated with the buyer account through acceptance of each of the security requirement sets. For example, the interface of FIG. 9 shows an example in which the buyer account (Buyer X) has requested supplier compliance with security requirement set NIST SP 800-171, Rev. 1, and in which two supplier accounts have accepted the buyer's request for compliance with security requirement set NIST SP 800-171, Rev. 1. It should be understood that the appearance and organization of various graphical elements, informational elements, and data entry elements of the selectable interface of FIG. 9 can vary in different embodiments of the buyer portal interface.

FIG. 10 shows an example selectable interface of the buyer portal interface listing each supplier account that is associated with the buyer account and that has been assigned a particular security requirement set (NIST SP 800-171, Rev. 1, in this example), in accordance with some embodiments of the invention. Each supplier account is identified by Supplier Name. For each supplier account, the date on which the buyer account requested the supplier account to comply with the particular security requirement set is shown. Also, for each supplier account, a Request Status (Assigned or Not Assigned) is shown to indicate whether or not the buyer account has requested the supplier account to comply with the particular security requirement set, along with a Status Date for the Request Status. Also, for each supplier account that has not been assigned the particular security requirement set, an Assign control is provided that when activated will cause the system 101 to send a request to the corresponding supplier account requesting compliance with the particular security requirement set on behalf of the buyer account. Also, for each supplier account that has already been assigned the particular security requirement set, an Unassign control is provided that when activated will cause the system 101 to remove the corresponding supplier account from a listing of suppliers that the buyer account has requested to comply with the particular security requirement set. Activation of the Unassign control will cause the system 101 to send a notification to the corresponding supplier account notifying that their responsibility to provide compliance attestation responses for the particular security requirement set for the benefit of the buyer account has been removed. It should be understood that the appearance and organization of various graphical elements, informational elements, and data entry elements of the selectable interface of FIG. 10 can vary in different embodiments of the buyer portal interface.

FIG. 11 shows an example selectable interface of the buyer portal interface listing each supplier account that is associated with the buyer account and showing how many security requirement sets have been assigned to each supplier account by the buyer account, in accordance with some embodiments of the invention. The interface of FIG. 11 also shows the Supplier ID within the system 101 for each supplier account. The interface of FIG. 11 also provides an Edit Supplier control for each supplier that when activated will cause the system 101 to display an interface through which supplier account information can be edited by the buyer account. The buyer account controls which supplier accounts are associated with the buyer account and when the supplier accounts are associated with the buyer account. The interface of FIG. 11 also provides an Add Supplier control that when activated will cause the system 101 to display the interface of FIG. 6. It should be understood that the appearance and organization of various graphical elements, informational elements, and data entry elements of the selectable interface of FIG. 11 can vary in different embodiments of the buyer portal interface.

Figure 12:
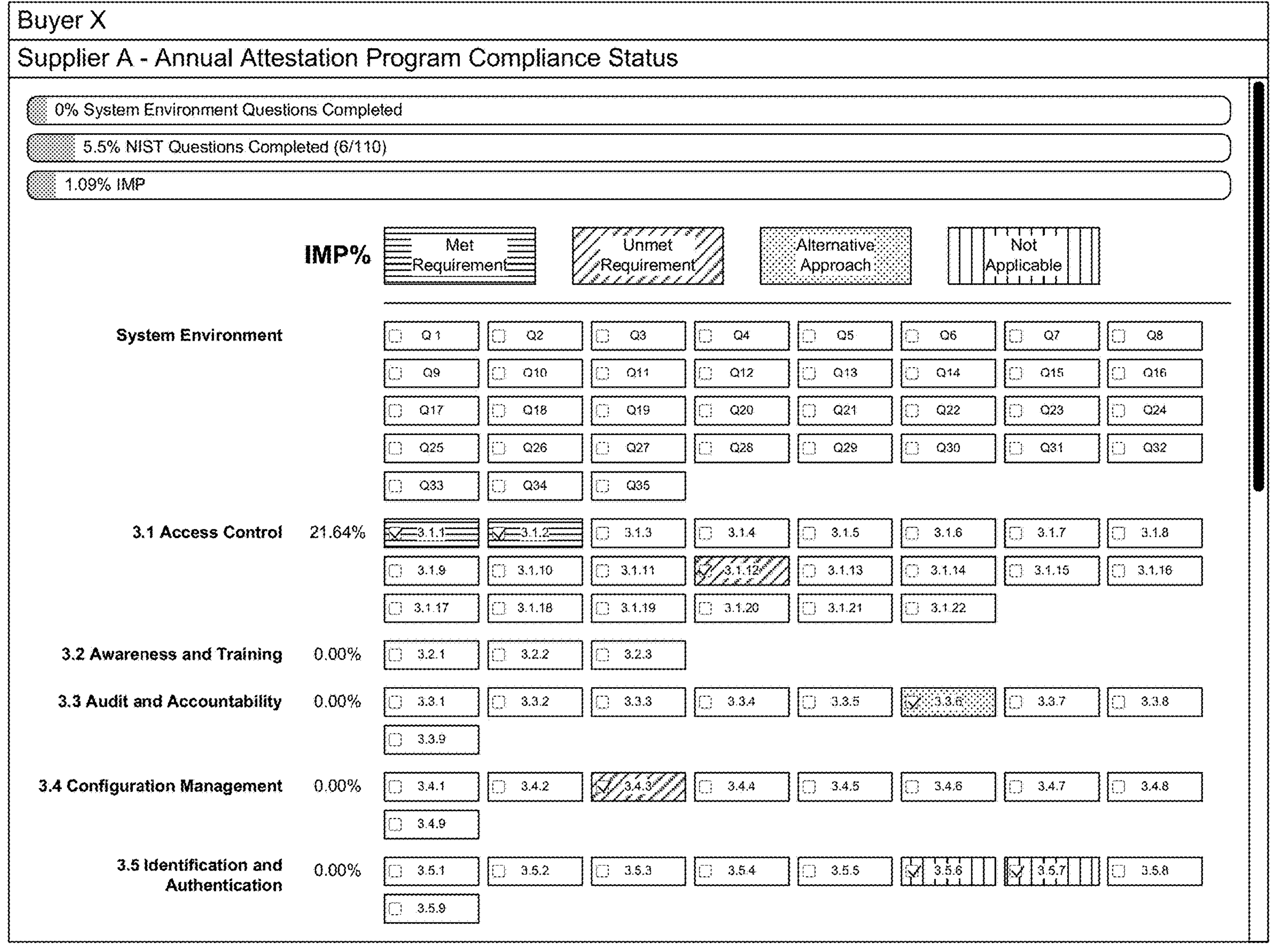
FIG. 12 shows an example selectable interface of the buyer portal interface that displays the continuous-real-time annual attestation program compliance status for a given supplier account that is associated with the buyer account, in accordance with some embodiments.

FIG. 12 shows an example selectable interface of the buyer portal interface that displays the continuous-real-time annual attestation program compliance status for a given supplier account (Supplier A in this example) that is associated with the buyer account, in accordance with some embodiments. The interface of FIG. 12 shows a graphical icon for each question (System Environment) that is currently assigned to the supplier account by the buyer account. The interface of FIG. 12 shows a graphical icon for each security requirement in the security requirement set that is currently assigned to the supplier account by the buyer account. Each graphical icon for the questions/security requirements is marked (such as by a check mark in the example) to show whether or not the supplier account has provided a current attestation response for the particular question/security requirement. Also, a display of each graphical icon for the security requirements is set to visually convey a compliance status for the particular security requirement, where the compliance status is either 1) security requirement met, 2) security requirement unmet, 3) alternative approach being used in lieu of security requirement, or 4) security requirement not applicable to supplier. In various embodiments, the display of each graphical icon for the security requirements can be set using different colors and/or shadings and/or markings to visually convey the compliance status for the particular question/security requirement. The interface of FIG. 12 shows a legend for the display settings of the graphical icons for the questions/security requirements.

The interface of FIG. 12 also shows a compliance attestations progress report for the supplier account indicating the percent/number of question responses that have been completed, the percent/number of security requirement attestation responses that have been completed, and the currently implementation percent for the supplier account. The implementation percent for the supplier account represents how much progress has been made toward the overall time required to complete the set of security requirements. The implementation percent for the supplier account takes into account the different amounts of time required to complete implementation of the different security requirements. Completion of implementation of a security requirement that takes a small amount of time will contribute less to the implementation percent for the supplier account than completion of implementation of a security requirement that takes a large amount of time. Also, when the security requirement set is delineated into sections, such as shown by Sections 3.1, 3.2, 3.3, 3.4, 3.5, etc. in the example of FIG. 12, the interface of FIG. 12 can show the implementation percent (IMP %) for each section of security requirements. It should be understood that the appearance and organization of various graphical elements, informational elements, and data entry elements of the selectable interface of FIG. 12 can vary in different embodiments of the buyer portal interface.

Figure 13:
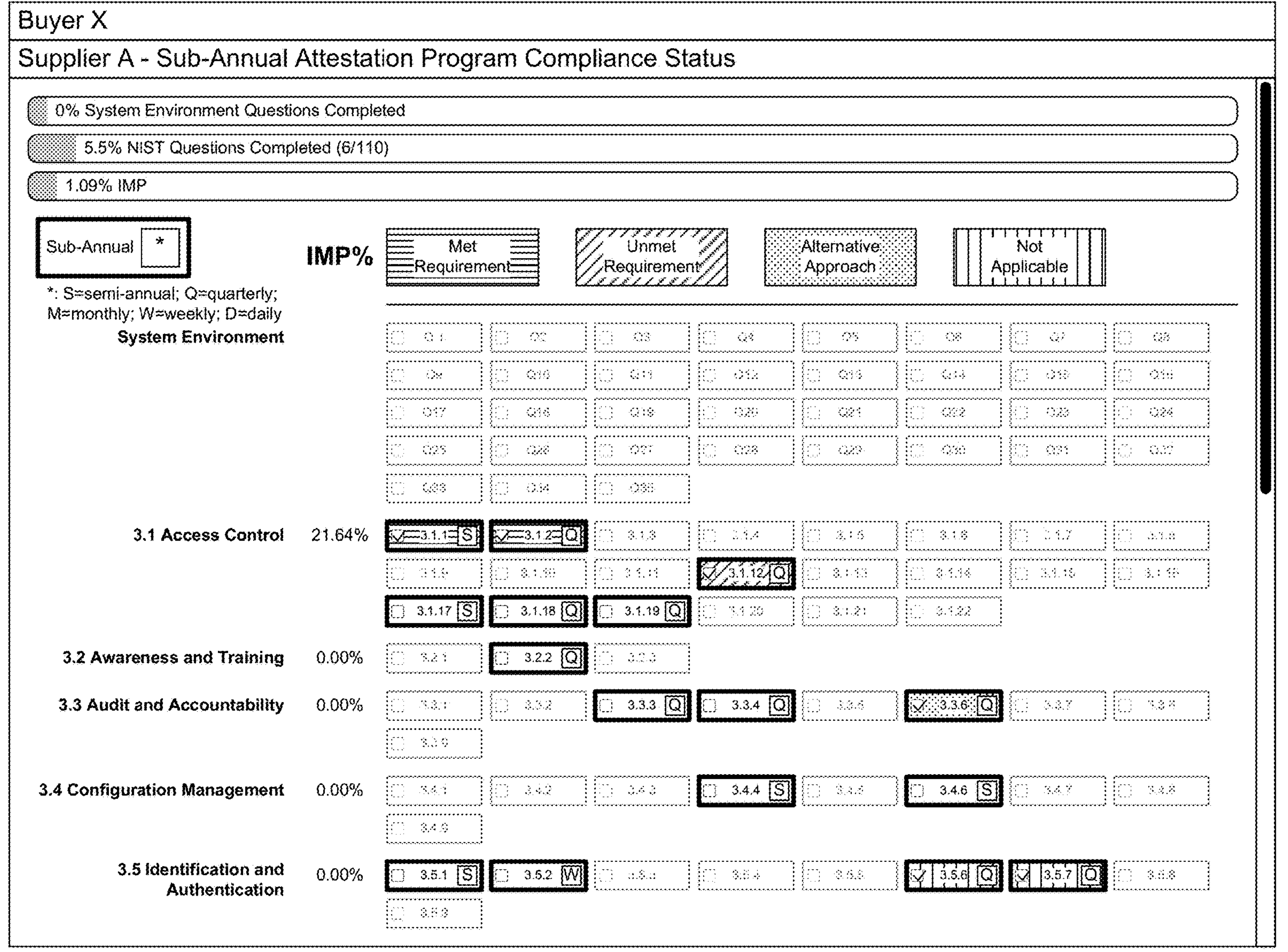
FIG. 13 shows an example selectable interface of the buyer portal interface that displays the continuous-real-time sub-annual attestation program compliance status for a given supplier account that is associated with the buyer account, in accordance with some embodiments.

FIG. 13 shows an example selectable interface of the buyer portal interface that displays the continuous-real-time sub-annual attestation program compliance status for a given supplier account (Supplier A in this example) that is associated with the buyer account, in accordance with some embodiments. The interface of FIG. 13 is similar to the interface of FIG. 12, with the exception that the interface of FIG. 13 conveys information about the supplier account compliance with the sub-annual attestation program 211 rather than with the annual attestation program 203. The interface of FIG. 13 shows a graphical icon for each non-security requirement question (System Environment) that is currently assigned to the supplier account by the buyer account. The interface of FIG. 13 additionally shows a graphical icon for each security requirement in the security requirement set that is currently assigned to the supplier account by the buyer account. Each graphical icon for the questions/security requirements is marked (such as by a check mark in the example) to show whether or not the supplier account has provided a current attestation response for the particular question/security requirement. Also, a display of each graphical icon for the security requirements is set to visually convey a compliance status for the particular security requirement, where the compliance status is either 1) security requirement met, 2) security requirement unmet, 3) alternative approach being used in lieu of security requirement, or 4) security requirement not applicable to supplier. In various embodiments, the display of each graphical icon for the questions/security requirements can be set using different colors and/or shadings and/or markings to visually convey the compliance status for the particular question/security requirement. The interface of FIG. 13 shows a legend for the display settings of the graphical icons for the questions/security requirements.

The interface of FIG. 13 identifies which of the questions/security requirements are included in the sub-annual attestation program 211. For example, in the interface of FIG. 13 the graphical icon for each question/security requirement that is part of the sub-annual attestation program 211 is shown to have a heavy outer border. Also, the graphical icon for each question/security requirement that is part of the sub-annual attestation program 211 shows the schedule of sub-annual attestation required for the particular question/security requirement, where the schedule is either semi-annual(S), quarterly (Q), monthly (M), weekly (W), or daily (D), in some embodiments. It should be understood that in other embodiments the schedule of sub-annual attestation required for a question/security requirement can be specified as something other than semi-annual(S), quarterly (Q), monthly (M), weekly (W), or daily (D). As with the interface of FIG. 12, the interface of FIG. 13 also shows the compliance attestation progress report for the supplier account indicating the percent/number of question responses that have been completed, the percent/number of security requirement attestation responses that have been completed, the current implementation percent for the supplier account, and the implementation percent (IMP %) for each section of security requirements. It should be understood that the appearance and organization of various graphical elements, informational elements, and data entry elements of the selectable interface of FIG. 13 can vary in different embodiments of the buyer portal interface.

FIG. 14 shows an example selectable interface of the buyer portal interface that displays details of a given security requirement compliance attestation response, in accordance with some embodiments. In some embodiments, selection of a graphical icon for a given question/security requirement in either the continuous-real-time annual attestation program compliance status interface of FIG. 12, or the continuous-real-time sub-annual attestation program compliance status interface of FIG. 13, causes display of the details of the supplier's compliance attestation response for the given question/security requirement, such as shown in FIG. 14. The example of FIG. 14 shows the description of the question/security requirement, supplemental information for the question/security requirement, the expected date for the supplier's compliance implementation (if it was answered with a "No" response) for the question/security requirement, the supplier's compliance attestation response (answer) for the question/security requirement, and any notes provided by the supplier regarding their compliance attestation response (answer) for the question/security requirement. It should be understood that the appearance and organization of various graphical elements, informational elements, and data entry elements of the selectable interface of FIG. 14 can vary in different embodiments of the buyer portal interface.

Figure 15:
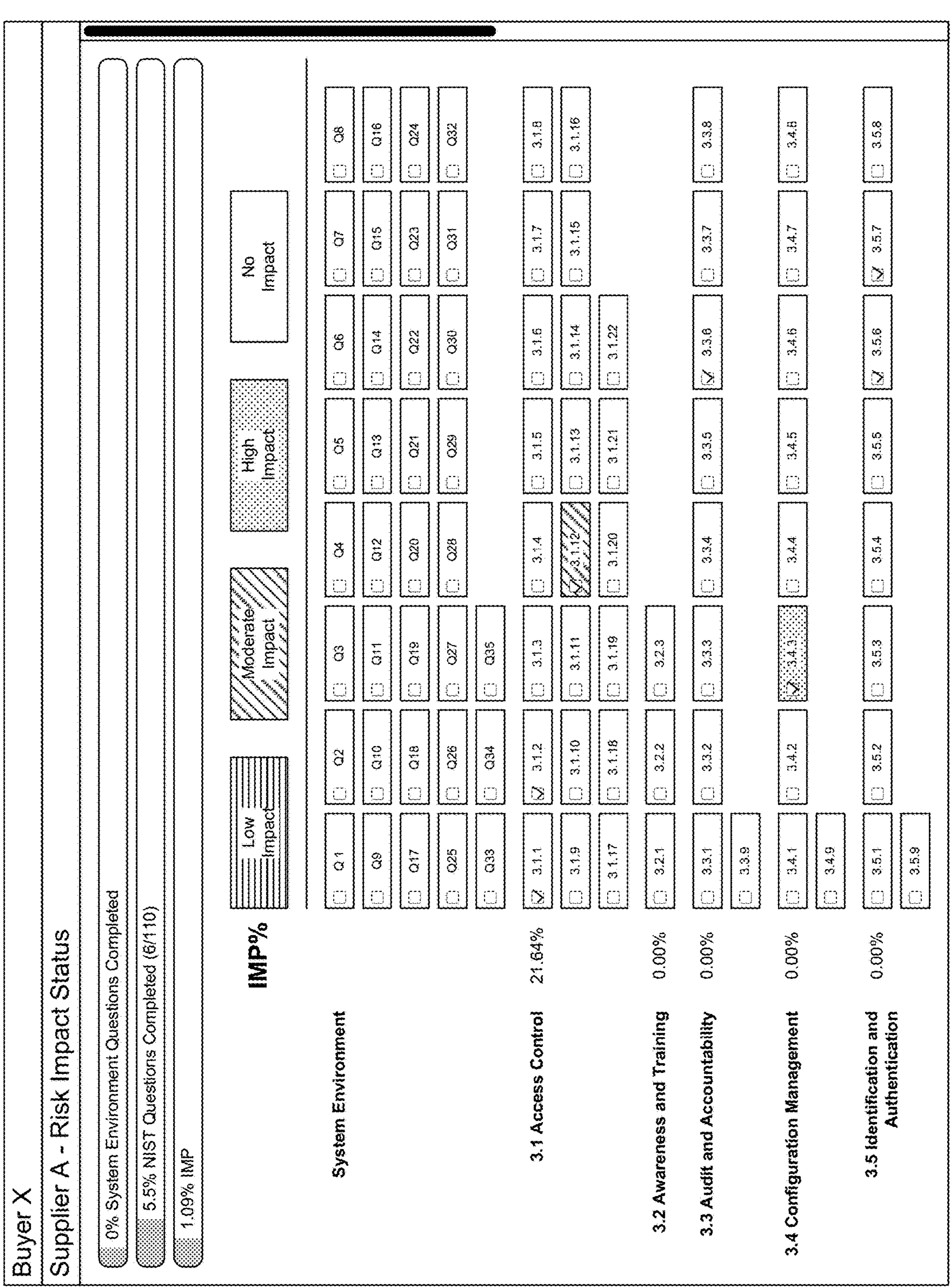
FIG. 15 shows an example selectable interface of the buyer portal interface that displays the continuous-real-time risk impact status for a given supplier account that is associated with the buyer account, in accordance with some embodiments.

FIG. 15 shows an example selectable interface of the buyer portal interface that displays the continuous-real-time risk impact status for a given supplier account (Supplier A in this example) that is associated with the buyer account, in accordance with some embodiments. The interface of FIG. 15 is similar to the interface of FIG. 12, with the exception that the interface of FIG. 15 conveys information about how the supplier's compliance attestation responses (answers) for the various assigned questions/security requirements impact the risk assessment of the supplier. The interface of FIG. 15 shows a graphical icon for each question (System Environment) that is currently assigned to the supplier account by the buyer account. The interface of FIG. 15 shows a graphical icon for each security requirement in the security requirement set that is currently assigned to the supplier account by the buyer account. Each graphical icon for the questions/security requirements is marked (such as by a check mark in the example) to show whether or not the supplier account has provided a current attestation response for the particular question/security requirement. Also, a display of each graphical icon for the security requirements is set to visually convey a risk impact status for the particular security requirement, where the risk impact status is either 1) low impact, 2) moderate impact, or 3) high impact. In various embodiments, the display of each graphical icon for the question/security requirements can be set using different colors and/or shadings and/or markings to visually convey the risk impact status for the particular question/security requirement. The interface of FIG. 15 shows a legend for the display settings of the graphical icons for the questions/security requirements. As with the interface of FIG. 12, the interface of FIG. 15 also shows the compliance attestation progress report for the supplier account indicating the percent/number of question responses that have been completed, the percent/number of security requirement attestation responses that have been completed, the current implementation percent for the supplier account, and the implementation percent (IMP %) for each section of security requirements. In some embodiments, selection of a graphical icon for a given question/security requirement in the continuous-real-time risk impact status interface of FIG. 13 causes display of the details of the supplier's compliance attestation response for the given question/security requirement, such as shown in FIG. 14. It should be understood that the appearance and organization of various graphical elements, informational elements, and data entry elements of the selectable interface of FIG. 15 can vary in different embodiments of the buyer portal interface.

In some embodiments, the buyer interface enables the buyer to create a number of supplier groups and add one or more suppliers to the supplier groups. A supplier group effectively represents an aggregation of supplier accounts that enables the buyer to assess supplier attestation compliance status across the aggregation of supplier accounts. For example, consider that a buyer has a first project that requires the buyer to use ten different suppliers, and a second project that requires the buyer to use five different suppliers, where each supplier for the first and second projects must comply with a specified set of security requirements. In this example, the buyer can create a first supplier group that includes the ten suppliers for the first project, and the buyer can create a second supplier group that includes the five suppliers for the second project. Then, the buyer can monitor supplier compliance status for the first supplier group to assess the risk level for exposing sensitive information on the first project, and the buyer can monitor supplier compliance status for the second supplier group to assess the risk level for exposing sensitive information on the second project. Also, if a given supplier is used on both the first project and the second project, the given supplier does not need to be concerned about providing information separately for the first project and the second project. Rather, the system 101 will apply the compliance attestation responses for the given supplier account to both the first supplier group and the second supplier group that are respectively associated with the first project and the second project. Also, if a given supplier account is assigned the same set of security requirements by different buyer accounts, the given supplier account does not need to be concerned about providing information separately for the different buyer accounts. Rather, the system 101 will apply the compliance attestation responses for the given supplier account to each of the different buyers to which the supplier account is associated. It should be understood that this ensures that uniformity is maintained in the compliance attestation responses for the given supplier account across different buyer accounts. Also, in some embodiments, the buyer interface enables the buyer to assign a priority level to each supplier group. The priority levels assigned to the various supplier groups can be used by the buyer as an aggregation parameter, a filtering parameter, and/or a sorting parameter when assessing the supplier attestation compliance on the supplier group level.

Figures 16, 17, 18:
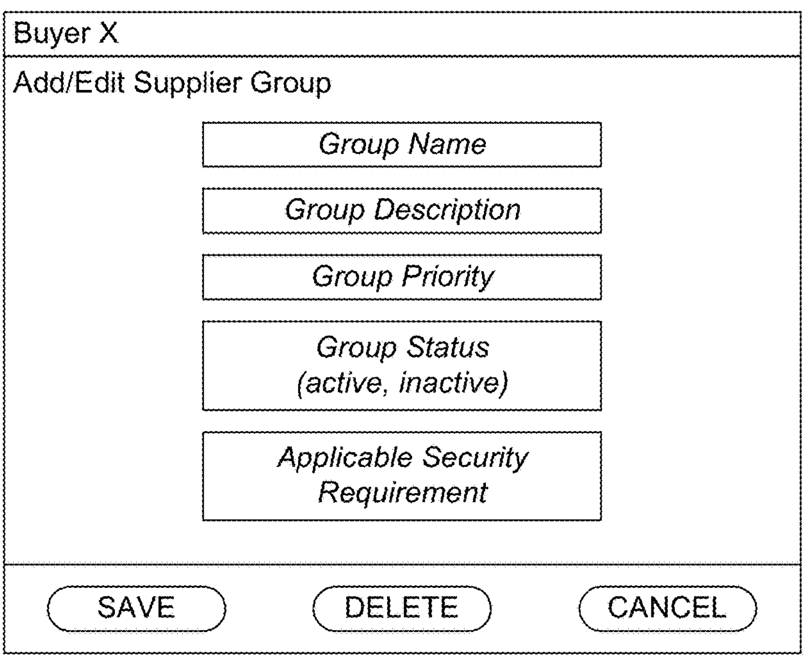
FIG. 16 shows an example selectable interface of the buyer portal interface through which a supplier group can be created, edited, or deleted, in accordance with some embodiments of the invention.
FIG. 17 shows an example selectable interface of the buyer portal interface displaying a listing of supplier groups associated with the buyer account, in accordance with some embodiments.
FIG. 18 shows an example selectable interface of the buyer portal interface displaying a listing of suppliers assigned to a particular supplier group, in accordance with some embodiments.

FIG. 16 shows an example selectable interface of the buyer portal interface through which a supplier group can be created, edited, or deleted, in accordance with some embodiments of the invention. The interface of FIG. 16 provides for entry of a Group Name of the supplier group and a description of the supplier group. The interface of FIG. 16 also provides for entry of a priority level for the supplier group. In some embodiments, the priority level for a supplier group is specified as an integer value. The interface of FIG. 16 also provides of specification of a status of the supplier group as either Active or Inactive. The interface of FIG. 16 also provides for specification of the security requirement set that is applicable to the supplier group. It should be understood that the appearance and organization of various graphical elements, informational elements, and data entry elements of the selectable interface of FIG. 16 can vary in different embodiments of the buyer portal interface.

FIG. 17 shows an example selectable interface of the buyer portal interface displaying a listing of supplier groups associated with the buyer account, in accordance with some embodiments. The listing of supplier groups includes the name of each supplier group, the description of each supplier group, the priority level assigned to each supplier group, the number of suppliers in each supplier group, and the exposure level of each supplier group. The exposure level of a given supplier group represents the likelihood that sensitive data will be exposed by any supplier in the given supplier group. Therefore, the exposure level of a given supplier group is effectively a high-water mark of the overall risk levels for the suppliers within the given supplier group. The interface of FIG. 17 also provides an edit control for each supplier group, that when activated will cause display of the interface of FIG. 16. It should be understood that the appearance and organization of various graphical elements, informational elements, and data entry elements of the selectable interface of FIG. 17 can vary in different embodiments of the buyer portal interface.

FIG. 18 shows an example selectable interface of the buyer portal interface displaying a listing of suppliers assigned to a particular supplier group (supplier group "Invest 5" in this example), in accordance with some embodiments. The interface of FIG. 18 shows the name of each supplier in the particular supplier group and the status of security requirement set assignment to each supplier in the particular supplier group. The interface of FIG. 18 also provides an Unassign control for each supplier that when activated will remove the corresponding supplier from the particular supplier group. The interface of FIG. 18 also provides an Add Supplier to Group control that when activated will cause display of a listing of supplier accounts that are associated with the buyer account in the system 101 and that are not already included in the particular supplier group, from which the buyer can select a supplier account for addition to the particular supplier group. It should be understood that the appearance and organization of various graphical elements, informational elements, and data entry elements of the selectable interface of FIG. 18 can vary in different embodiments of the buyer portal interface.

Figure 19:
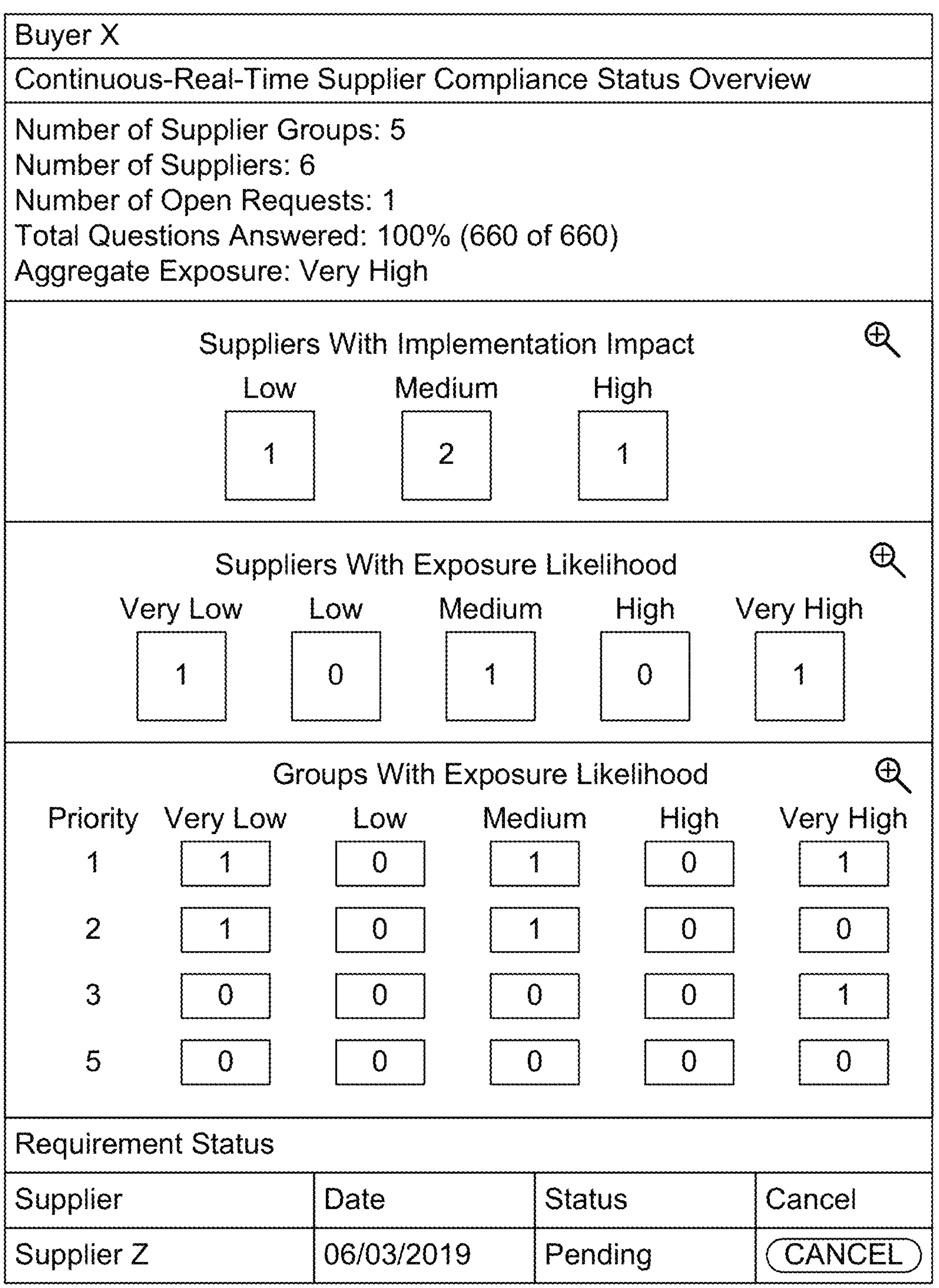
FIG. 19 shows an example selectable interface of the buyer portal interface that provides an overview of the continuous-real-time supplier compliance status for the buyer account, in accordance with some embodiments.

FIG. 19 shows an example selectable interface of the buyer portal interface that provides an overview of the continuous-real-time supplier compliance status for the buyer account, in accordance with some embodiments. The buyer interface of FIG. 19 shows how many supplier groups exist in the buyer account, how many supplier accounts are associated with the buyer account, how many supplier compliance requests are outstanding for the buyer account, what percentage of assigned questions/security requirements have been completed by the supplier accounts associated with the buyer account, and an aggregate exposure level of the buyer account. The aggregate exposure level of the buyer account represents the likelihood that sensitive data will be exposed by any supplier that has a supplier account associated with the buyer account. The interface of FIG. 19 also shows a summary count of supplier's (that have respective supplier accounts associated with the buyer account) that have implementation risk impact in each of the implementation risk impact categories, such as 1) low impact, 2) moderate impact, or 3) high impact. The interface of FIG. 19 also shows a summary count of supplier's (that have respective supplier accounts associated with the buyer account) that have a likelihood of exposing sensitive data in various exposure likelihood categories, such as very low, low, moderate, high, very high. The interface of FIG. 19 also shows a summary count of supplier groups that have a likelihood of exposing sensitive data in various exposure likelihood categories, such as very low, low, moderate, high, very high. More specifically, the summary count of supplier groups that have a likelihood of exposing sensitive data shows how many supplier groups of the buyer currently include at least one supplier that has a sensitive data exposure likelihood in the sensitive data exposure likelihood categories of very low, low, moderate, high, and very high. Also, in some embodiments, the summary count of supplier groups that have a likelihood of exposing sensitive data can be parsed according to the priority levels assigned to the supplier groups. The buyer interface of FIG. 19 also shows a listing of compliance requests that have been issued by the buyer account and not yet accepted by the supplier account, with a control for cancelling any of the outstanding/pending compliance requests. It should be understood that the appearance and organization of various graphical elements, informational elements, and data entry elements of the selectable interface of FIG. 19 can vary in different embodiments of the buyer portal interface.

FIG. 20 shows an example selectable interface of the buyer portal interface that displays a supplier compliance summary table for the buyer account, in accordance with some embodiments. The supplier compliance summary table shows a listing of the supplier accounts that are associated with the buyer account. For each supplier account, the supplier compliance summary table shows how many questions/security requirements have been answered by the corresponding supplier and how many of the different types of answers have been provided by the corresponding supplier. For each supplier account, the supplier compliance summary table also shows the progress percent for the supplier, where the progress percent represents the percentage of the assigned questions/security requirements that have been answered by the corresponding supplier. For each supplier account, the supplier compliance summary table also shows the implementation percent for the supplier, where the implementation percent represents how much progress has been made toward the overall time expected to complete the implementation for the questions/security requirements. For each supplier account, the supplier compliance summary table also shows the overall exposure level (high-water exposure level) for the supplier. For each supplier account, the supplier compliance summary table also shows how many security requirements are currently classified as having low risk impact, moderate risk impact, and high risk impact, respectively, for the supplier. It should be understood that the appearance and organization of various graphical elements, informational elements, and data entry elements of the selectable interface of FIG. 20 can vary in different embodiments of the buyer portal interface.

FIG. 21 shows an example selectable interface of the buyer portal interface that displays a supplier group compliance summary table for the buyer account, in accordance with some embodiments. The supplier group compliance summary table shows a listing of the supplier groups of the buyer account. For each supplier group, the supplier group compliance summary table shows how many questions/security requirements have been answered by the suppliers in the corresponding supplier group and how many of the different types of answers have been provided by the suppliers in the corresponding supplier group. For each supplier group, the supplier group compliance summary table also shows the progress percent for the supplier group, where the progress percent represents the percentage of the assigned questions/security requirements that have been answered by all the suppliers in the corresponding supplier group. For each supplier group, the supplier group compliance summary table also shows the implementation percent for all the suppliers in the corresponding supplier group, where the implementation percent represents how much progress has been made toward the overall time expected to complete the implementation for the questions/security requirements by all the suppliers in the corresponding supplier group. For each supplier group, the supplier group compliance summary table also shows the overall exposure level (high-water exposure level) for the supplier group. For each supplier group, the supplier group compliance summary table also shows how many security requirements are currently classified as having low risk impact, moderate risk impact, and high risk impact, respectively, for all the suppliers in the corresponding supplier group. It should be understood that the appearance and organization of various graphical elements, informational elements, and data entry elements of the selectable interface of FIG. 21 can vary in different embodiments of the buyer portal interface.

FIG. 22 shows an example selectable interface of the supplier portal interface through which supplier account information can be updated, in accordance with some embodiments of the invention. The interface of FIG. 22 shows the Supplier ID and Supplier Name as entered into the system 101 by the buyer through their buyer account. The interface of FIG. 22 enables the supplier to enter and update information for the supplier, including the physical address of the supplier, the contact information for the supplier, the supplier's NAICS list, the supplier size, and other supplier information. It should be understood that the appearance and organization of various graphical elements, informational elements, and data entry elements of the selectable interface of FIG. 22 can vary in different embodiments of the supplier portal interface.

FIG. 23 shows an example selectable interface of the supplier portal interface through which the supplier account can grant access privilege to and remove access privilege from each buyer account to which the supplier account is associated, in accordance with some embodiments. The interface of FIG. 23 shows an identifier of a given set of security requirements and a listing of buyer accounts that are associated with the supplier account with regard to the supplier providing compliance attestation responses for the given set of security requirements. For each buyer account in the listing of buyer accounts, the interface of FIG. 23 enables the supplier to grant or revoke access privilege to the supplier's annual attestation program 203 and associated attestation responses. Also, for each buyer account in the listing of buyer accounts, the interface of FIG. 23 enables the supplier to grant or revoke access privilege to the supplier's sub-annual attestation program 203 and associated attestation responses. It should be understood that the appearance and organization of various graphical elements, informational elements, and data entry elements of the selectable interface of FIG. 23 can vary in different embodiments of the supplier portal interface.

FIG. 24 shows an example selectable interface of the supplier portal interface through which a new user of the supplier can be created and edited, in accordance with some embodiments of the invention. The interface of FIG. 24 provides for specification of User Name and User Contact Information (such as an email address, physical address, phone number, etc.). The interface of FIG. 24 also enables changing of a user status to either Active or Inactive. The interface of FIG. 24 also enables modification of permissions for user. The interface of FIG. 24 also enables the user to change their password for accessing the supplier account within the system 101. It should be understood that the appearance and organization of various graphical elements, informational elements, and data entry elements of the selectable interface of FIG. 24 can vary in different embodiments of the supplier portal interface.

FIG. 25 shows an example selectable interface of the supplier portal interface through which the annual attestation program 203 for the supplier can be defined, in accordance with some embodiments. The interface of FIG. 25 enables the supplier to specify the annual term 205, the critical security requirements 207, and the per-year security requirement selections 209 of the annual attestation program 203. In the example interface of FIG. 25, each security requirement is listed, and a set of selection controls is provided for each listed security requirement. The set of selection controls includes a critical select control that when selected will specify the corresponding securing requirement as being a critical security requirement. The set of selection controls includes a separate year select control for each year of the specified annual term 205. Selection of a given year select control designates that the attestation response for the corresponding security requirement is due in the year of the annual term 205 corresponding to the given year select control. The number of separate year select controls is dynamically adjusted in the interface based on the value entered for the annual term 205. For example, if the annual term 205 is 5, then 5 separate year select controls (Year 1, Year 2, Year 3, Year 4, Year 5) will be shown for each listed security requirement. The interface of FIG. 25 also enables the supplier to specify the annual attestation response due date. It should be understood that the appearance and organization of various graphical elements, informational elements, and data entry elements of the selectable interface of FIG. 25 can vary in different embodiments of the supplier portal interface.

FIG. 26 shows an example selectable interface of the supplier portal interface through which the sub-annual attestation program 211 for the supplier can be defined, in accordance with some embodiments. The interface of FIG. 26 enables the supplier to specify the sub-annual security requirements 215 and the per-period security requirement selections 217. In the example interface of FIG. 26, each security requirement is listed, and a set of selection controls is provided for each listed security requirement. The set of selection controls includes a semi-annual selection control, a quarterly selection control, a monthly selection control, a weekly selection control, and a daily selection control. Each semi-annual selection control has a corresponding reference month/day entry. Selection of the semi-annual selection control for a given security requirement indicates that the compliance attestation responses for the given security requirement are due twice per year as scheduled based on the corresponding reference month/day entry. Specifically, the compliance attestation responses for the given security requirement having the semi-annual selection control selected are due each year on the reference month/day, and on the day that occurs six months after the reference month/day. Each quarterly selection control has a corresponding reference month/day entry. Selection of the quarterly selection control for a given security requirement indicates that the compliance attestation responses for the given security requirement are due four times per year as scheduled based on the corresponding reference month/day entry. Specifically, the compliance attestation responses for the given security requirement having the quarterly selection control selected are due each year on the reference month/day, and on the day that occurs three months after the reference month/day, and on the day that occurs six months after the reference month/day, and on the day that occurs nine months after the reference month/day. Each monthly selection control has a corresponding reference day entry. Selection of the monthly selection control for a given security requirement indicates that the compliance attestation responses for the given security requirement are due twelve times per year as scheduled based on the corresponding reference day entry. Specifically, the compliance attestation responses for the given security requirement having the monthly selection control selected are due each month on the reference day. Each weekly selection control has a corresponding reference day (of the week) entry. Selection of the weekly selection control for a given security requirement indicates that the compliance attestation responses for the given security requirement are due each week on the reference day. In an example embodiment, the reference day is 1 for Sunday, 2 for Monday, 3 for Tuesday, 4 for Wednesday, 5 for Thursday, 6 for Friday, and 7 for Saturday. Selection of the daily selection control for a given security requirement indicates that the compliance attestation responses for the given security requirement are due each day. It should be understood that the appearance and organization of various graphical elements, informational elements, and data entry elements of the selectable interface of FIG. 26 can vary in different embodiments of the supplier portal interface.

Also, in some embodiments, the supplier portal interface provides a selectable interface like that of FIG. 12 to display the continuous-real-time annual attestation program compliance status for the supplier's account with regard to a particular buyer account, in accordance with some embodiments. Also, in some embodiments, the supplier portal interface provides a selectable interface like that of FIG. 13 to display the continuous-real-time sub-annual attestation program compliance status for the supplier's account with regard to a particular buyer account, in accordance with some embodiments. Also, in some embodiments, the supplier portal interface provides a selectable interface like that of FIG. 15 to display the continuous-real-time risk impact status for the supplier's account with regard to a particular buyer account, in accordance with some embodiments.

FIG. 27 shows an example selectable interface of the supplier portal interface through which the supplier can provide response to a required set of questions, in accordance with some embodiments. In some embodiments, selection of a graphical icon for a given question in either the continuous-real-time annual attestation program compliance status interface of FIG. 12, or the continuous-real-time sub-annual attestation program compliance status interface of FIG. 13, or the continuous-real-time risk impact status interface of FIG. 15 causes display of the interface of FIG. 27. The example of FIG. 27 shows the description of the question, the expected date for the supplier's response to the question, the supplier's response (answer) to the question, and any notes provided by the supplier regarding their response (answer) to the question. It should be understood that the appearance and organization of various graphical elements, informational elements, and data entry elements of the selectable interface of FIG. 27 can vary in different embodiments of the supplier portal interface.

FIG. 28 shows an example selectable interface of the supplier portal interface through which the supplier can provide attestation responses to a specified security requirement set, in accordance with some embodiments. In some embodiments, selection of a graphical icon for a given question in either the continuous-real-time annual attestation program compliance status interface of FIG. 12, or the continuous-real-time sub-annual attestation program compliance status interface of FIG. 13, or the continuous-real-time risk impact status interface of FIG. 15 causes display of the interface of FIG. 28. The example of FIG. 28 shows the description of the security requirement, supplemental information for the security requirement, the expected date for the supplier's compliance attestation response for the security requirement, the supplier's compliance attestation response (answer) for the security requirement, and any notes provided by the supplier regarding their compliance attestation response (answer) for the security requirement. It should be understood that the appearance and organization of various graphical elements, informational elements, and data entry elements of the selectable interface of FIG. 28 can vary in different embodiments of the supplier portal interface.

FIG. 29 shows an example selectable interface of the supplier portal interface through which the supplier can specify how evidence was collected and reviewed to support the supplier's attestation responses to the specified security requirement set, in accordance with some embodiments. The interface of FIG. 29 shows a listing of the security requirements for which the supplier is required to provide compliance attestation responses. For each security requirement in the listing, the interface of FIG. 29 shows a set of evidence collection selection controls and a set of evidence review selection controls. In some embodiments, the set of evidence collection selection controls includes a self-collected selection control, a third-party collected selection control, and an automatically collected selection control. In some embodiments, the set of evidence review selection controls includes a self-reviewed selection control and a third-party reviewed selection control. The set of evidence collection selection controls for a given security requirement enables the supplier to specify how the evidence that supports the supplier's compliance attestation response for the given security requirement was collected. The set of evidence review selection controls for a given security requirement enables the supplier to specify how the evidence that supports the supplier's compliance attestation response for the given security requirement was reviewed. The system 101 uses the evidence collection specification and evidence review specification for a given security requirement to determine a confidence level for the supplier's compliance attestation response for the given security requirement. In some embodiments, a combination of self-collected evidence collection and self-reviewed evidence review corresponds to a confidence level of 1 on a scale of 1 to 5, where 1 is lowest confidence and 5 is highest confidence. And, a combination of self-collected evidence collection and third-party-reviewed evidence review corresponds to a confidence level of 2 on the confidence scale of 1 to 5. And, a combination of third-party-collected evidence collection and third-party-reviewed evidence review corresponds to a confidence level of 3 on the confidence scale of 1 to 5. And, a combination of automatically collected evidence collection and self-reviewed evidence review corresponds to a confidence level of 4 on the confidence scale of 1 to 5. And, a combination of automatically collected evidence collection and third-party-reviewed evidence review corresponds to a confidence level of 5 on the confidence scale of 1 to 5. In some embodiments, the interface of FIG. 29 also shows risk levels assigned to each of the security requirements. In some embodiments, multiple risk levels are assigned to a given security requirement by different organizations. For example, FIG. 29 shows one risk level assigned to each of the security requirements by the Department of Defense (DoD) and another risk level assigned to each of the security requirements by an alternate source, such as by the entity that provides the system 101. It should be understood that the appearance and organization of various graphical elements, informational elements, and data entry elements of the selectable interface of FIG. 29 can vary in different embodiments of the supplier portal interface.

FIG. 30 shows an example selectable interface of the supplier portal interface that provides an overview of the continuous-real-time supplier compliance status for the supplier account, in accordance with some embodiments. The interface of FIG. 30 shows a listing of pending compliance requests that have been received by the supplier account from one or more buyer accounts. The interface of FIG. 30 also shows a listing of accepted compliance requests from one or more buyer accounts that have been accepted by the supplier account. The interface of FIG. 30 also shows a summary of the compliance attestation response status for accepted compliance requests, including a listing of security requirement sections, and a count of the total number of questions in each security requirement section, and a count of how many questions have been answered in each security requirement section, and response completion percentage for each security requirement section. It should be understood that the appearance and organization of various graphical elements, informational elements, and data entry elements of the selectable interface of FIG. 30 can vary in different embodiments of the supplier portal interface.

Various embodiments are disclosed herein for the system 101 for implementing a continuous attestation program. In an example embodiment, the system 101 includes the buyer portal logic 109 controlling transmission and display of data on the buyer computing device 103. Also, the buyer portal logic 109 enables a buyer to specify a set of security requirements for attestation by a supplier. The system 101 also includes the supplier portal logic 113 controlling transmission and display of data on the supplier computing device 105. The system 101 also includes the attestation program logic 115 enabling the supplier to define the continuous attestation program 201 for the set of security requirements through a supplier interface provided by the supplier portal logic 113. In some embodiments, the continuation attestation program 201 includes both the annual attestation program 203 and a sub-annual attestation program 211. The system 101 also includes the attestation data collection logic 121 operating to receive compliance attestation responses from the supplier for the set of security requirements and correlate the compliance attestation responses to the continuous attestation program 201 for the supplier. The system 101 also includes the attestation sharing logic 117 enabling the supplier to specify an access privilege for the buyer through the supplier interface provided by the supplier portal logic 113. The access privilege allows the buyer to access and view either annual continuous attestation program data for the supplier or both annual and sub-annual attestation program data for the supplier. The system 101 also includes the supplier evaluation logic 111 automatically generating evaluation metrics for the supplier in real-time based on: the continuous attestation program 201 for the supplier, and the compliance attestation responses received from the supplier, and a set of risk levels respectively corresponding to the set of security requirements. The evaluation metrics include an overall risk level for the supplier. Also, the supplier evaluation logic 111 exposes in real-time the overall risk level for the supplier to the buyer through the buyer portal logic 109, in accordance with the access privilege for the buyer.

The automatic generation of evaluation metrics for the supplier by the supplier evaluation logic 111 is processed by a backend computing system that does not require user input for triggering the generation of evaluation metrics. Automatic generation of the evaluation metrics for the supplier is a process that is not part of a user interface accessible by the buyer and/or the supplier. Automatic generation of the evaluation metrics for the supplier is a server process that acts on data supplied by the supplier using a portion of the backend computing system that is not accessible to the supplier. Automatic generation of some evaluation metrics for the supplier uses pre-defined risk levels for the security requirements, with the automatically generated evaluation metrics being used to automatically assign an overall risk level to the supplier. In some embodiments, the automatic generation of the evaluation metrics for the supplier are used to assign an overall risk level to the supplier based on a custom-assigned risk-weighting for one or more of the security requirements. The custom-assigned risk-weightings for the security requirements are not accessible for modification by the supplier.

The system 101 also includes the database system 123 interfaced with each of the buyer portal logic 109, the supplier portal logic 113, the attestation program logic 115, the attestation data collection logic 121, the attestation sharing logic 117, and the supplier evaluation logic 111. The database system 123 operates to store data defining the continuous attestation program 201 for the supplier. The database system 123 also operates to store compliance attestation responses received from the supplier. The database system 123 also operates to store the access privilege for the buyer. The database system 123 also operates to store the set of risk levels respectively corresponding to the set of security requirements. In some embodiments, the system 101 also includes the attestation implementation support logic 119 operating to provide notifications to the supplier regarding due dates and status updates for the continuous attestation program 201 for the supplier. The attestation implementation support logic 119 is interfaced with the database system 123.

A backend computing system uses data segregation in the database system 123 to maintain a division between data that is only accessible by the supplier and data that is only accessible by the buyer and data is that not accessible by either the supplier or the buyer. The backend computing system also uses data segregation in the database system 123 to maintain security over the risk levels assigned to the security requirements, and over the overall risk level generated for and assigned to the supplier. The risk levels of the supplier are portable (can be transmitted) for viewing by one or more buyers, based on permission settings for the buyer(s) in the database system 123 that are set by the supplier and that are not accessible by the buyer(s). It should be understood that the evaluation metrics for the supplier, as generated by the supplier evaluation logic 111, are maintained in the database system 123 in a secured manner such that the evaluation metrics for the supplier are not modifiable by the supplier. Also, the supplier evaluation logic 111 that is used to generate the evaluation metrics for the supplier is not accessible by the supplier, so as to maintain verifiable integrity of the data and processes used for the automatic generation of the evaluation metrics for the supplier. Also, the security provided by the database system 123 provides an audit trail for monitoring and tracking changes made over time to prevent fraudulent modifications and/or false generation of attestation data and corresponding evaluation metrics for the supplier. The monitoring and tracking of data changes within the database system 123 over time can be associated with time stamps for each data entry and verification logic for confirming data entries made and time frames for the data entries.

The buyer portal logic 109 generates and transmits data defining a buyer interface to the buyer computing device 103. In some embodiments, the buyer interface includes a first selectable view showing how many suppliers of the buyer currently have an implementation impact in each of a plurality of implementation impact categories (such as low impact, moderate impact, and high impact). In some embodiments, the first selectable view also shows how many suppliers of the buyer currently have a sensitive data exposure likelihood in each of a plurality of sensitive data exposure likelihood categories (such as very low, low, moderate, high, very high).

In some embodiments, the buyer interface includes a second selectable view showing a listing of suppliers of the buyer. In some embodiments, the second selectable view shows a current compliance attestation status of each supplier in the listing of suppliers in accordance with the access privilege for the buyer. In some embodiments, the second selectable view shows a current sensitive data exposure likelihood of each supplier in the listing of suppliers in accordance with the access privilege for the buyer. In some embodiments, the buyer interface includes a third selectable view showing details of supplier compliance attestation responses in accordance with the access privilege for the buyer. In some embodiments, the buyer interface includes a fourth selectable view showing confidence levels for supplier compliance attestation responses in accordance with the access privilege for the buyer.

In some embodiments, the buyer interface enables the buyer to create and edit a supplier account for the supplier. Also, in some embodiments, the buyer interface enables the buyer to create and edit a user account for the buyer. In some embodiments, the buyer interface enables the buyer to transmit a security requirement compliance attestation request to the supplier.

In some embodiments, the buyer interface enables the buyer to create a number of supplier groups and add one or more suppliers to the supplier groups. In some embodiments, the buyer interface shows how many supplier groups of the buyer currently include at least one supplier that has a sensitive data exposure likelihood in each of a plurality of sensitive data exposure likelihood categories (such as very low, low, moderate, high, very high). In some embodiments, the buyer interface shows a group-level sensitive data exposure likelihood for each of the number of supplier groups, where the group-level sensitive data exposure likelihood for a given supplier group is a worse case sensitive data exposure likelihood for suppliers within the given supplier group. In some embodiments, the buyer interface enables the buyer to assign a priority level to each supplier group. In some embodiments, the buyer portal logic 109 is configured to aggregate supplier groups in accordance with the priority level assigned to each supplier group when showing how many supplier groups of the buyer currently include at least one supplier that has sensitive data exposure likelihood in each of the plurality of sensitive data exposure likelihood categories.

The attestation program logic 115 enables the supplier to set the annual term 205 for the annual attestation program 203. The annual term is the length in years in which supplier compliance attestations responses must be provided at least once by the supplier for all security requirements in the specified set of security requirements. The attestation program logic 115 enables the supplier to specify which security requirements in the set of security requirements are critical security requirements 207 and which security requirements in the set of security requirements are non-critical security requirements. Supplier compliance attestations responses must be provided for each critical security requirement 207 in each year of the annual term 205. Supplier compliance attestations responses must be provided at least once over the annual term 205 for each non-critical security requirement. The attestation program logic 115 enables the supplier to specify which of the non-critical security requirements require attestation in each year of the annual term 205, as previously mentioned with regard to the per-year security requirement selections 209.

The attestation program logic 115 enables the supplier to define the sub-annual attestation program 211 by specifying which security requirements in the set of security requirements are sub-annual security requirements 215 that require sub-annual attestation. The attestation program logic 115 also enables the supplier to define a sub-annual attestation schedule for each of the sub-annual security requirements 215, where the sub-annual attestation schedule for a given sub-annual security requirement specifies a frequency at which supplier compliance attestations responses must be provided by the supplier for the given sub-annual security requirement, as previously mentioned with regard to the per-period security requirement selections 217.

The supplier portal logic 113 generates and transmits data defining a supplier interface to the supplier computing device 105. The supplier interface enables the supplier to define, view, and modify the annual attestation program 203 for the set of security requirements. The supplier interface also enables the supplier to define, view, and modify the sub-annual attestation program 211 for the set of security requirements. The supplier interface shows a current compliance attestation status of the supplier for the set of security requirements based on the annual attestation program 203. The supplier interface shows a current sensitive data exposure likelihood of the supplier for the set of security requirements based on the annual attestation program 203. The supplier interface also shows a current compliance attestation status of the supplier for the set of security requirements based on the sub-annual attestation program 211. The supplier interface also shows a current sensitive data exposure likelihood of the supplier for the set of security requirements based on the sub-annual attestation program 211.

In some embodiments, the attestation data collection logic 121 enables the supplier to specify how evidence supporting each compliance attestation response was collected and reviewed. The supplier evaluation logic 111 determines respective confidence levels for the compliance attestation responses received from the supplier based on how evidence supporting the compliance attestation responses was collected and reviewed. In some embodiments, the buyer interface shows the respective confidence levels for the compliance attestation responses received from the supplier.

Figure 31:
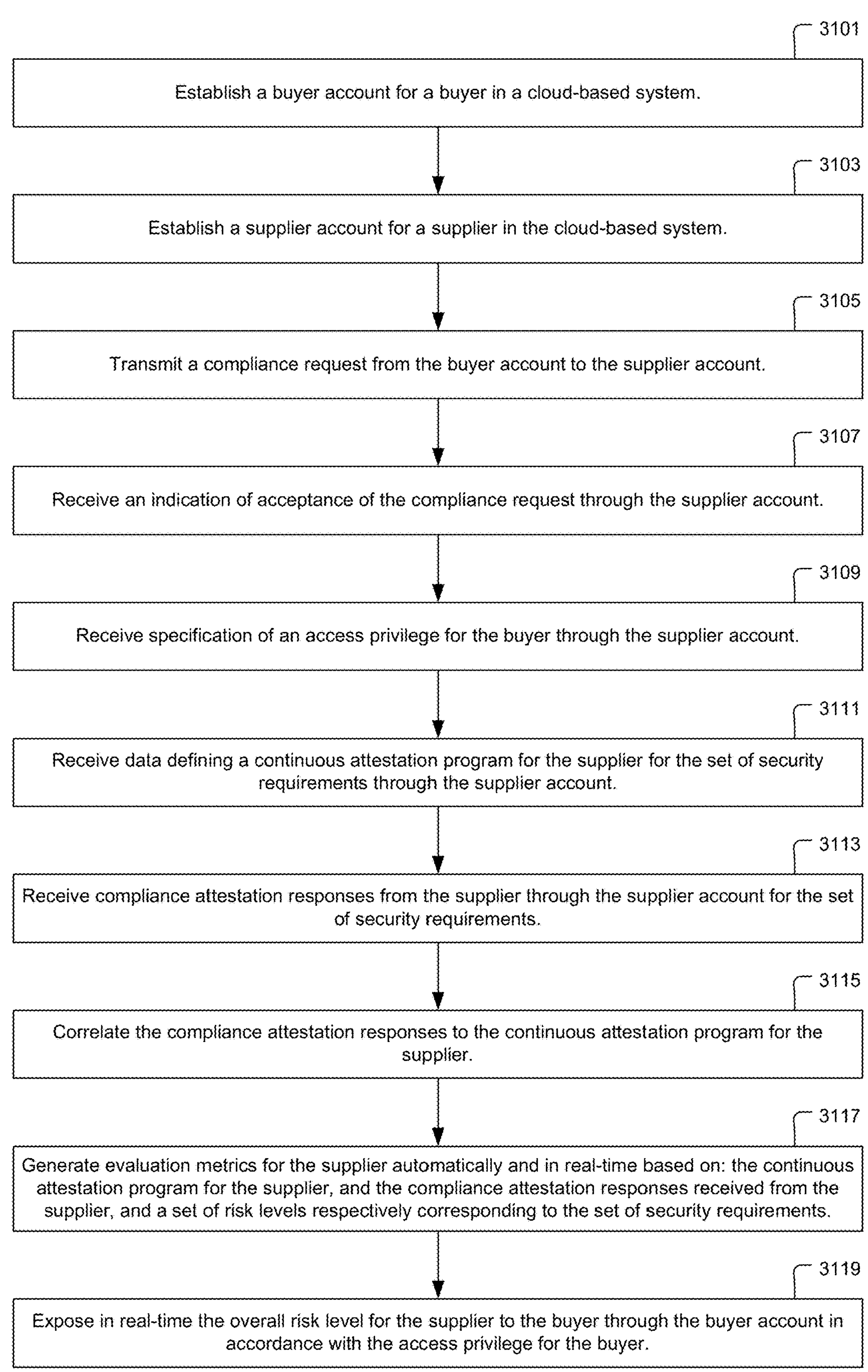
FIG. 31 shows a flowchart of a method for implementing a continuous attestation program, in accordance with some embodiments of the present invention.

FIG. 31 shows a flowchart of a method for implementing a continuous attestation program, in accordance with some embodiments of the present invention. The method includes an operation 3101 for establishing a buyer account for a buyer in a cloud-based system (101). The method also includes an operation 3103 for establishing a supplier account for a supplier in the cloud-based system (101). The method also includes an operation 3105 for transmitting a compliance request from the buyer account to the supplier account. The compliance request specifies a set of security requirements for attestation by the supplier. The method also includes an operation 3107 for receiving an indication of acceptance of the compliance request through the supplier account. The method also includes an operation 3109 for receiving specification of an access privilege for the buyer through the supplier account. The access privilege allows the buyer to access and view either annual continuous attestation program (203) data for the supplier, or both annual attestation program (203) data and sub-annual attestation program (211) data for the supplier. The method also includes an operation 3111 for receiving data defining a continuous attestation program (201) for the supplier for the set of security requirements through the supplier account. The continuation attestation program (201) includes and annual attestation program (203) and a sub-annual attestation program (211). The method also includes an operation 3113 for receiving compliance attestation responses from the supplier through the supplier account for the set of security requirements. The method also includes an operation 3115 for correlating the compliance attestation responses to the continuous attestation program (201) for the supplier. The method also includes an operation 3117 for generating evaluation metrics for the supplier automatically and in real-time based on: the continuous attestation program (201) for the supplier, and the compliance attestation responses received from the supplier, and a set of risk levels respectively corresponding to the set of security requirements. The evaluation metrics include an overall risk level for the supplier. The method also includes an operation 3119 for exposing in real-time the overall risk level for the supplier to the buyer through the buyer account in accordance with the access privilege for the buyer.

In some embodiments, the method includes storing continuous attestation program implementation data in a database system (123). The continuous attestation program implementation data includes definition of the continuous attestation program (201) for the supplier, compliance attestation responses received from the supplier, the access privilege for the buyer, and the set of risk levels respectively corresponding to the set of security requirements. In some embodiments, the method includes providing notifications to the supplier regarding due dates and status updates for the continuous attestation program (201) for the supplier.

In some embodiments, the method includes generating and transmitting data defining a buyer interface to a buyer computing device (103) through the buyer account. In some embodiments, the buyer interface includes a first selectable view showing: how many suppliers of the buyer currently have an implementation impact in each of a plurality of implementation impact categories (such as low impact, moderate impact, and high impact), and how many suppliers of the buyer currently have a sensitive data exposure likelihood in each of a plurality of sensitive data exposure likelihood categories (such as very low, low, moderate, high, and very high). In some embodiments, the buyer interface includes a second selectable view showing: a listing of suppliers of the buyer, and a current compliance attestation status of each supplier in the listing of suppliers in accordance with the access privilege for the buyer, and a current sensitive data exposure likelihood of each supplier in the listing of suppliers in accordance with the access privilege for the buyer. In some embodiments, the buyer interface includes a third selectable view showing details of supplier compliance attestation responses in accordance with the access privilege for the buyer. In some embodiments, the buyer interface includes a fourth selectable view showing confidence levels for supplier compliance attestation responses in accordance with the access privilege for the buyer.

In some embodiments, the method includes creating a number of supplier groups through the buyer account. The method also includes adding one or more suppliers to the supplier groups through the buyer account. And, the method includes generating and transmitting data to show in the buyer interface how many supplier groups of the buyer currently include at least one supplier that has a sensitive data exposure likelihood in each of a plurality of sensitive data exposure likelihood categories (such as very low, low, moderate, high, and very high). In some embodiments, the buyer interface shows a group-level sensitive data exposure likelihood for each of the number of supplier groups, where the group-level sensitive data exposure likelihood for a given supplier group is a worse case sensitive data exposure likelihood for suppliers within the given supplier group. In some embodiments, the method includes assigning a priority level to each supplier group through the buyer account. In some embodiments, the method includes aggregating supplier groups in accordance with the priority level assigned to each supplier group when showing how many supplier groups of the buyer currently include at least one supplier that has sensitive data exposure likelihood in each of the plurality of sensitive data exposure likelihood categories.

In some embodiments, the method includes receiving specification of an annual term (205) for the annual attestation program (203), where the annual term (205) is a length in years in which supplier compliance attestations responses must be provided at least once by the supplier for all security requirements in the set of security requirements. The method also includes receiving specification of which security requirements in the set of security requirements are critical security requirements (207) and which security requirements in the set of security requirements are non-critical security requirements. Supplier compliance attestations responses must be provided for each critical security requirement (207) in each year of the annual term (205). Supplier compliance attestations responses must be provided at least one over the annual term (205) for each non-critical security requirement. The method also includes receiving specification of which of the non-critical security requirements require attestation in each year of the annual term (205).

In some embodiments, the method includes generating and transmitting data defining a supplier interface to a supplier computing device (105) through the supplier account, where the supplier interface enables the supplier to define, view, and modify the annual attestation program (203) for the set of security requirements. In some embodiments, the supplier interface shows: a current compliance attestation status of the supplier for the set of security requirements based on the annual attestation program (203), and a current sensitive data exposure likelihood of the supplier for the set of security requirements based on the annual attestation program (203).

In some embodiments, the method includes receiving specification of which security requirements in the set of security requirements are sub-annual security requirements (215) that require sub-annual attestation. The method also includes receiving specification of a sub-annual attestation schedule for each of the sub-annual security requirements, where the sub-annual attestation schedule for a given sub-annual security requirement specifies a frequency at which supplier compliance attestations responses must be provided by the supplier for the given sub-annual security requirement, such as previously described with regard to the per-period security requirements selections (217). The method also includes generating and transmitting data for the supplier interface to enable the supplier to define, view, and modify the sub-annual attestation program (211) for the set of security requirements. In some embodiments, the supplier interface shows: a current compliance attestation status of the supplier for the set of security requirements based on the sub-annual attestation program (211), and a current sensitive data exposure likelihood of the supplier for the set of security requirements based on the sub-annual attestation program (211).

In some embodiments, the method includes receiving data from the supplier specifying how evidence supporting each compliance attestation response was collected and reviewed. The method also includes determining respective confidence levels for the compliance attestation responses received from the supplier based on how evidence supporting the compliance attestation responses was collected and reviewed. The method also includes generating and transmitting data for the buyer interface to show the respective confidence levels for the compliance attestation responses received from the supplier.

The continuous attestation system 101 disclosed herein provides for auditing, evaluating, and tracking of supplier security requirement attestations. The continuous attestation system 101 is operable to perform supply chain security requirement attestation functions, such as collecting supply chain data (information about one or more suppliers), collecting security requirement attestation data for the suppliers in the supply chain, generating compliance metrics (overall supplier risk level, overall supplier confidence level, etc.) for suppliers in the supply chain, and providing the buyer with access to the continuous attestation program 201 and corresponding attestation data of the suppliers in the supply chain in accordance with access permissions granted by the suppliers. The continuous attestation system 101 also allows a buyer process a supplier's continuous attestation program 201 and corresponding attestation data through one or more of analysis, filtering by one or more parameters, and organizing by one or more parameters.

The continuous attestation system 101 disclosed herein resolves problems and difficulty associated with manual definition and setting of calendar events for security requirement attestation events and notifications. The continuous attestation system 101 disclosed herein enables definition and presentation of a supplier's continuous attestation program 201 in a manner (visual format) that is consumable by a buyer to which the supplier has given access permission. The continuous attestation system 101 disclosed herein also provides for smart notification to support the continuous compliance actions necessary to implement the supplier's continuous attestation program 201. The continuous attestation system 101 disclosed herein allows suppliers to: 1) visually define their continuous attestation program 201 for satisfying their annual and sub-annual attestation reporting needs, 2) dynamically determine which buyers can access and view the supplier's annual attestations, 3) dynamically determine which buyers can access and view the supplier's sub-annual attestations, 4) implement the supplier's continuous attestation program 201 by notifying users of the supplier when attestations are due, 5) collecting supplier attestation information, 6) compute supplier metrics based on the collected supplier attestation information, and 7) sharing information and supplier metrics to appropriate buyers allowing them to make risk-based decisions on the use of the supplier.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the present invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in various terms, such as generating, producing, identifying, determining, and/or comparing.

Any of the operations described herein that form part of the invention are useful machine operations. The invention also relates to a device or an apparatus for performing these operations. The apparatus may be specially constructed for the required purpose, such as a special purpose computer. When defined as a special purpose computer, the computer can also perform other processing, program execution or routines that are not part of the special purpose, while still being capable of operating for the special purpose. Alternatively, the operations may be processed by a general purpose computer selectively activated or configured by one or more computer programs stored in the computer memory, cache, or obtained over a network. In particular, various general-purpose machines can be used with computer programs written in accordance with the teachings herein, or it may be more convenient to construct a more specialized apparatus to perform the required operations. Also, when data is obtained over a network the data maybe processed by other computers on the network, e.g., a cloud of computing resources.

The embodiments of the present invention can also be defined as a machine that transforms data from one state to another state. The data may represent an article, that can be represented as an electronic signal and electronically manipulate data. The transformed data can, in some cases, be visually depicted on a display, representing the physical object that results from the transformation of data. The transformed data can be saved to storage generally, or in particular formats that enable the construction or depiction of a physical and tangible object. In some embodiments, the manipulation can be performed by a processor. In such an example, the processor thus transforms the data from one thing to another. Still further, the methods can be processed by one or more machines or processors that can be connected over a network. Each machine can transform data from one state or thing to another, and can also process data, save data to storage, transmit data over a network, display the result, or communicate the result to another machine.

The invention can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, DVDs, magnetic tapes, and other optical and non-optical data storage devices. The computer readable medium can also be distributed over a network of coupled computer systems so that the computer readable code is stored and executed in a distributed fashion.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Although the foregoing invention has been described in some detail for purposes of clarity of understanding, it will be apparent that certain changes and modifications can be practiced within the scope of the invention description. Accordingly, the present embodiments are to be considered as illustrative and not restrictive, and the invention is not to be limited to the details given herein, but may be modified within the scope and equivalents of the described embodiments.

What is claimed is:

1. A method for implementing a continuous attestation program, comprising:

establishing a buyer account for a buyer in a computer system;

creating a plurality of supplier groups through the buyer account;

assigning a plurality of sets of security requirements to the plurality of supplier groups through the buyer account, such that each of the plurality of supplier groups is assigned a different one of the plurality of sets of security requirements;

adding at least one supplier to each of the plurality of supplier groups through the buyer account;

receiving data defining a first continuous attestation program for a first supplier within a first supplier group of the plurality of supplier groups, the first continuous attestation program configured for a first set of security requirements of the plurality of sets of security requirements;

receiving a first set of compliance attestation responses from the first supplier with regard to the first continuous attestation program;

generating and transmitting data defining a buyer interface to a buyer computing device through the buyer account, the buyer interface showing the plurality of supplier groups, the plurality of sets of security requirements assigned to the plurality of supplier groups, and the suppliers added to the plurality of supplier groups; and controlling exposure of supplier data for the first supplier within the buyer interface in accordance with a first buyer access level currently assigned to the buyer account by the first supplier, wherein the first buyer access level is set to disallow viewing of at least a portion of the supplier data for the first supplier within the buyer interface.

2. The method as recited in claim 1, wherein controlling exposure of supplier data for the first supplier is performed dynamically such that the first buyer access level is adjusted dynamically.

3. The method as recited in claim 1, wherein the first buyer access level is set to disallow viewing of at least a portion of the supplier data for the first supplier within the buyer interface.

4. The method as recited in claim 1, wherein the first buyer access level is set to disallow viewing of at least a portion of a supply chain of the first supplier.

5. The method as recited in claim 1, wherein the first buyer access level is set to allow viewing of a specified portion of a supply chain of the first supplier, wherein the specified portion of the supply chain of the first supplier includes at least one supplier to the first supplier.

6. The method as recited in claim 1, further comprising:

generating evaluation metrics for the first supplier in real-time based on the first continuous attestation program for the first supplier, the first set of compliance attestation responses received from the first supplier, and a set of risk levels respectively corresponding to the first set of security requirements of the plurality of sets of security requirements.

7. The method as recited in claim 6, wherein the evaluation metrics for the first supplier include one or more of an overall confidence level for the first supplier and an overall likelihood of exposure for the first supplier.

8. The method as recited in claim 7, wherein the first buyer access level is set to disallow viewing of the first continuous attestation program for the first supplier.

9. The method as recited in claim 7, wherein the first buyer access level is set to disallow viewing of the first set of compliance attestation responses received from the first supplier.

10. The method as recited in claim 7, wherein the first buyer access level is set to allow display of a visual representation within the buyer interface of the first continuous attestation program for the first supplier, the first set of compliance attestation responses received from the first supplier, and the set of risk levels respectively corresponding to the first set of security requirements of the plurality of sets of security requirements.

11. The method as recited in claim 7, wherein the evaluation metrics for the first supplier include an overall risk level for the first supplier.

12. The method as recited in claim 1, further comprising:

receiving data defining a second continuous attestation program for a second supplier within a second supplier group of the plurality of supplier groups, the second continuous attestation program configured for a second set of security requirements of the plurality of sets of security requirements;

receiving a second set of compliance attestation responses from the second supplier with regard to the second continuous attestation program; and controlling exposure of supplier data for the second supplier within the buyer interface in accordance with a second buyer access level currently assigned to the buyer account, wherein the second buyer access level is set to disallow viewing of at least a portion of the supplier data for the second supplier within the buyer interface.

13. The method as recited in claim 1, wherein the second buyer access level is different than the first buyer access level.

14. The method as recited in claim 1, wherein controlling exposure of supplier data for each of the first supplier and the second supplier is performed dynamically such that each of the first buyer access level and the second buyer access level is adjusted dynamically and independently.

15. The method as recited in claim 1, wherein the first buyer access level is set to disallow viewing of at least a portion of the supplier data for the first supplier within the buyer interface, and wherein the second buyer access level is set to disallow viewing of at least a portion of the supplier data for the second supplier within the buyer interface.

16. The method as recited in claim 1, wherein the first buyer access level is set to disallow viewing of at least a portion of a supply chain of the first supplier, and wherein the second buyer access level is set to disallow viewing of at least a portion of a supply chain of the second supplier.

17. The method as recited in claim 1, wherein the first buyer access level is set to allow viewing of a specified portion of a supply chain of the first supplier, wherein the specified portion of the supply chain of the first supplier includes at least one supplier to the first supplier, and wherein the second buyer access level is set to allow viewing of a specified portion of a supply chain of the second supplier, wherein the specified portion of the supply chain of the second supplier includes at least one supplier to the second supplier.

18. The method as recited in claim 1, further comprising:

generating evaluation metrics for the first supplier in real-time based on the first continuous attestation program for the first supplier, the first set of compliance attestation responses received from the first supplier, and a set of risk levels respectively corresponding to the first set of security requirements of the plurality of sets of security requirements; and generating evaluation metrics for the second supplier in real-time based on the second continuous attestation program for the second supplier, the second set of compliance attestation responses received from the second supplier, and a set of risk levels respectively corresponding to the second set of security requirements of the plurality of sets of security requirements.

19. The method as recited in claim 18, wherein the evaluation metrics for the first supplier include one or more of an overall risk level for the first supplier, an overall confidence level for the first supplier, and an overall likelihood of exposure for the first supplier, and wherein the evaluation metrics for the second supplier include one or more of an overall risk level for the second supplier, an overall confidence level for the second supplier, and an overall likelihood of exposure for the second supplier.

20. The method as recited in claim 19, wherein the first buyer access level is set to disallow viewing of one or more of the first continuous attestation program for the first supplier and the first set of compliance attestation responses received from the first supplier, and wherein the second buyer access level is set to disallow viewing of one or more of the second continuous attestation program for the second supplier and the second set of compliance attestation responses received from the second supplier.

21. The method as recited in claim 19, wherein the first buyer access level is set to allow display of a visual representation within the buyer interface of the first continuous attestation program for the first supplier, the first set of compliance attestation responses received from the first supplier, and the set of risk levels respectively corresponding to the first set of security requirements of the plurality of sets of security requirements, and wherein the second buyer access level is set to allow display of a visual representation within the buyer interface of the second continuous attestation program for the second supplier, the second set of compliance attestation responses received from the second supplier, and the set of risk levels respectively corresponding to the second set of security requirements of the plurality of sets of security requirements.

* * * * *